US008250396B2

(12) United States Patent
Arimilli et al.

(10) Patent No.: US 8,250,396 B2
(45) Date of Patent: Aug. 21, 2012

(54) HARDWARE WAKE-AND-GO MECHANISM FOR A DATA PROCESSING SYSTEM

(75) Inventors: Ravi K. Arimilli, Austin, TX (US); Satya P. Sharma, Austin, TX (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/024,595

(22) Filed: Feb. 1, 2008

(65) Prior Publication Data
US 2009/0199030 A1 Aug. 6, 2009

(51) Int. Cl.
*G06F 1/00* (2006.01)
*G06F 1/32* (2006.01)

(52) U.S. Cl. ......... 713/323; 713/300; 713/320; 711/204
(58) Field of Classification Search .................. 713/300, 713/320, 323; 711/204
See application file for complete search history.

(56) References Cited

U.S. PATENT DOCUMENTS

| | | | |
|---|---|---|---|
| 4,733,352 A | 3/1988 | Nakamura et al. |
| 4,918,653 A | 4/1990 | Johri et al. |
| 5,083,266 A | 1/1992 | Watanabe |
| 5,161,227 A | 11/1992 | Dias et al. |
| 5,202,988 A | 4/1993 | Spix et al. |
| 5,243,596 A | 9/1993 | Port et al. |
| 5,247,693 A | 9/1993 | Bristol |
| 5,274,809 A | 12/1993 | Iwasaki et al. |
| 5,392,433 A | 2/1995 | Hammersley et al. |
| 5,471,633 A | 11/1995 | Colwell et al. |
| 5,483,641 A | 1/1996 | Jones et al. |
| 5,524,223 A | 6/1996 | Lazaravich et al. |
| 5,598,560 A | 1/1997 | Benson |
| 5,678,026 A | 10/1997 | Vartti et al. |
| 5,832,272 A | 11/1998 | Kalantery |
| 5,852,731 A * | 12/1998 | Wang et al. .................. 718/100 |
| 5,890,200 A | 3/1999 | Merchant |
| 5,928,322 A | 7/1999 | Bitar et al. |
| 5,974,439 A | 10/1999 | Bollella |
| 6,044,220 A | 3/2000 | Breternitz, Jr. |
| 6,105,049 A | 8/2000 | Govindaraju et al. |

(Continued)

OTHER PUBLICATIONS

U.S. Appl. No. 12/024,797, filed Feb. 1, 2008, Arimilli et al.

(Continued)

*Primary Examiner* — Thuan Du
*Assistant Examiner* — Michael J Brown
(74) *Attorney, Agent, or Firm* — Stephen R. Tkacs; Stephen J. Walder, Jr.; Matthew B. Talpis

(57) ABSTRACT

A hardware wake-and-go mechanism is provided for a data processing system. The wake-and-go mechanism recognizes a programming idiom that indicates that a thread is waiting for an event. The wake-and-go mechanism updates a wake-and-go array with a target address associated with the event. The thread then goes to sleep until the event occurs. The wake-and-go array may be a content addressable memory (CAM). When a transaction appears on the symmetric multiprocessing (SMP) fabric that modifies the value at a target address in the CAM, the CAM returns a list of storage addresses at which the target address is stored. The wake-and-go mechanism associates these storage addresses with the threads waiting for an even at the target addresses, and may wake the one or more threads waiting for the event.

20 Claims, 22 Drawing Sheets

U.S. PATENT DOCUMENTS

| | | |
|---|---|---|
| 6,122,692 A | 9/2000 | Okpisz et al. |
| 6,128,710 A | 10/2000 | Greenspan et al. |
| 6,157,940 A | 12/2000 | Marullo et al. |
| 6,195,676 B1 | 2/2001 | Spix et al. |
| 6,223,208 B1 | 4/2001 | Kiefer et al. |
| 6,247,025 B1 | 6/2001 | Bacon |
| 6,269,391 B1 | 7/2001 | Gillespie |
| 6,324,622 B1 | 11/2001 | Okpisz et al. |
| 6,324,686 B1 | 11/2001 | Komatsu et al. |
| 6,343,344 B1 | 1/2002 | Arimilli et al. |
| 6,353,875 B1 | 3/2002 | Arimilli et al. |
| 6,411,982 B2 | 6/2002 | Williams |
| 6,493,741 B1 | 12/2002 | Emer et al. |
| 6,591,321 B1 | 7/2003 | Arimilli et al. |
| 6,594,783 B1 | 7/2003 | Dollin et al. |
| 6,633,897 B1 | 10/2003 | Browning et al. |
| 6,662,354 B1 | 12/2003 | Krablin et al. |
| RE38,388 E | 1/2004 | Sarangdhar et al. |
| 6,675,191 B1 | 1/2004 | Ito |
| 6,681,345 B1 | 1/2004 | Storino et al. |
| 6,697,899 B1 | 2/2004 | Kasuga |
| 6,704,843 B1 | 3/2004 | Arimilli et al. |
| 6,704,844 B2 | 3/2004 | Arimilli et al. |
| 6,735,769 B1 | 5/2004 | Brenner et al. |
| 6,779,036 B1 | 8/2004 | Deshpande |
| 6,779,089 B2 | 8/2004 | Lin et al. |
| 6,785,774 B2 | 8/2004 | Arimilli et al. |
| 6,859,834 B1 | 2/2005 | Arora et al. |
| 6,874,144 B1 | 3/2005 | Kush |
| 6,886,064 B2 | 4/2005 | Dawkins et al. |
| 6,889,344 B2 | 5/2005 | Williams |
| 6,892,286 B2 | 5/2005 | Hangal et al. |
| 6,904,535 B2 | 6/2005 | Yamada et al. |
| 6,910,211 B1 | 6/2005 | Wilhelm |
| 6,934,950 B1 | 8/2005 | Tuel et al. |
| 6,956,865 B1 | 10/2005 | Khaunte et al. |
| 6,965,961 B1 | 11/2005 | Scott |
| 7,028,299 B1 | 4/2006 | Chang |
| 7,039,794 B2 | 5/2006 | Rodgers et al. |
| 7,058,948 B2 | 6/2006 | Hoyle |
| 7,065,765 B2 | 6/2006 | Cadden et al. |
| 7,065,766 B2 | 6/2006 | Brenner |
| 7,124,249 B1 | 10/2006 | Darcy |
| 7,162,666 B2 | 1/2007 | Bono |
| 7,171,649 B1 | 1/2007 | Lawrence |
| 7,185,338 B2 | 2/2007 | Chamdani et al. |
| 7,188,262 B2 | 3/2007 | Arends et al. |
| 7,203,932 B1 | 4/2007 | Gaudet et al. |
| 7,210,146 B2 | 4/2007 | Hsieh |
| 7,237,071 B2 | 6/2007 | Jahnke |
| 7,269,713 B2 | 9/2007 | Anderson et al. |
| 7,293,163 B2 | 11/2007 | Caprioli et al. |
| 7,296,264 B2 | 11/2007 | Zatloukal et al. |
| 7,301,832 B2 | 11/2007 | Trinh et al. |
| 7,302,684 B2 | 11/2007 | Hsieh |
| 7,310,722 B2 | 12/2007 | Moy et al. |
| 7,328,293 B2 | 2/2008 | Hammarlund et al. |
| 7,350,024 B2 | 3/2008 | Chen et al. |
| 7,363,474 B2 | 4/2008 | Rodgers et al. |
| 7,434,000 B1 | 10/2008 | Barreh et al. |
| 7,461,148 B1 | 12/2008 | Beloussov et al. |
| 7,533,242 B1 | 5/2009 | Moll et al. |
| 7,603,502 B2 | 10/2009 | Richter et al. |
| 7,647,443 B1 | 1/2010 | Chatterjee et al. |
| 7,738,367 B1 | 6/2010 | Aggarwal et al. |
| 7,788,657 B2 | 8/2010 | Wannamaker et al. |
| 7,856,636 B2 | 12/2010 | Bhatia et al. |
| 7,904,685 B1 | 3/2011 | Alverson et al. |
| 8,015,379 B2 | 9/2011 | Arimilli et al. |
| 8,082,315 B2 | 12/2011 | Arimilli et al. |
| 8,127,080 B2 | 2/2012 | Arimilli et al. |
| 2003/0046518 A1 | 3/2003 | Karp et al. |
| 2003/0051064 A1 | 3/2003 | Curtis |
| 2003/0060898 A1 | 3/2003 | Jenkins |
| 2003/0061258 A1 | 3/2003 | Rodgers et al. |
| 2003/0140338 A1 | 7/2003 | Bowers |
| 2003/0225870 A1* | 12/2003 | Sandadi et al. ............... 709/223 |
| 2004/0002974 A1 | 1/2004 | Kravitz et al. |
| 2004/0010667 A1 | 1/2004 | Brenner |
| 2004/0015969 A1 | 1/2004 | Chang |
| 2004/0025160 A1 | 2/2004 | Dice et al. |
| 2004/0068607 A1 | 4/2004 | Narad |
| 2004/0073905 A1 | 4/2004 | Emer et al. |
| 2004/0093602 A1 | 5/2004 | Huston et al. |
| 2004/0154011 A1 | 8/2004 | Wang et al. |
| 2004/0158822 A1 | 8/2004 | Sandham et al. |
| 2004/0168007 A1 | 8/2004 | Okazawa et al. |
| 2004/0246980 A1 | 12/2004 | Balakrishnan |
| 2004/0263521 A1 | 12/2004 | Booth et al. |
| 2005/0022173 A1 | 1/2005 | Kanade |
| 2005/0033945 A1 | 2/2005 | Chauvel et al. |
| 2005/0055594 A1 | 3/2005 | Doering et al. |
| 2005/0060705 A1 | 3/2005 | Katti et al. |
| 2005/0080962 A1 | 4/2005 | Penkovski et al. |
| 2005/0081185 A1 | 4/2005 | Stoodley et al. |
| 2005/0081200 A1 | 4/2005 | Rutten et al. |
| 2005/0081204 A1 | 4/2005 | Schopp |
| 2005/0108711 A1 | 5/2005 | Arnold et al. |
| 2005/0125802 A1 | 6/2005 | Wang et al. |
| 2005/0132378 A1 | 6/2005 | Horvitz et al. |
| 2005/0138629 A1 | 6/2005 | Samra |
| 2005/0149697 A1 | 7/2005 | Enright et al. |
| 2005/0149936 A1 | 7/2005 | Pilkington |
| 2005/0149937 A1 | 7/2005 | Pilkington |
| 2005/0166195 A1 | 7/2005 | Kawahito |
| 2005/0262270 A1 | 11/2005 | Latorre et al. |
| 2005/0268106 A1 | 12/2005 | Mansell et al. |
| 2006/0005197 A1* | 1/2006 | Saha et al. ............... 718/104 |
| 2006/0037020 A1 | 2/2006 | Accapadi et al. |
| 2006/0048149 A1 | 3/2006 | Clift |
| 2006/0048160 A1 | 3/2006 | Olszewski et al. |
| 2006/0053423 A1 | 3/2006 | Jones et al. |
| 2006/0069738 A1 | 3/2006 | Hoogerbrugge |
| 2006/0090168 A1 | 4/2006 | Ogasawara et al. |
| 2006/0093044 A1 | 5/2006 | Grantham et al. |
| 2006/0117316 A1 | 6/2006 | Cismas et al. |
| 2006/0130062 A1 | 6/2006 | Burdick et al. |
| 2006/0136915 A1 | 6/2006 | Aingaran et al. |
| 2006/0136919 A1 | 6/2006 | Aingaran et al. |
| 2006/0143415 A1 | 6/2006 | Naik |
| 2006/0149935 A1 | 7/2006 | Eickemeyer et al. |
| 2006/0168283 A1 | 7/2006 | Georgiou et al. |
| 2006/0200826 A1 | 9/2006 | Tamura et al. |
| 2006/0212945 A1 | 9/2006 | Donlin et al. |
| 2006/0218556 A1 | 9/2006 | Nemirovsky et al. |
| 2006/0225077 A1 | 10/2006 | Anderson |
| 2006/0236136 A1 | 10/2006 | Jones |
| 2006/0242645 A1 | 10/2006 | Codrescu et al. |
| 2006/0259907 A1 | 11/2006 | Bhatia et al. |
| 2007/0006231 A1 | 1/2007 | Wang et al. |
| 2007/0043915 A1 | 2/2007 | Moir et al. |
| 2007/0050603 A1 | 3/2007 | Vorbach et al. |
| 2007/0061805 A1 | 3/2007 | Brenner |
| 2007/0067774 A1 | 3/2007 | Kukanov et al. |
| 2007/0073693 A1 | 3/2007 | Harris et al. |
| 2007/0083730 A1 | 4/2007 | Vorbach et al. |
| 2007/0094431 A1 | 4/2007 | Fachan |
| 2007/0106983 A1 | 5/2007 | Owen et al. |
| 2007/0124545 A1 | 5/2007 | Blanchard et al. |
| 2007/0143755 A1 | 6/2007 | Sahu et al. |
| 2007/0150658 A1 | 6/2007 | Moses et al. |
| 2007/0156971 A1 | 7/2007 | Sistla et al. |
| 2007/0157182 A1 | 7/2007 | Zatloukal et al. |
| 2007/0180187 A1 | 8/2007 | Olson et al. |
| 2007/0186028 A2 | 8/2007 | Kissell |
| 2007/0198772 A1 | 8/2007 | Dai et al. |
| 2007/0240124 A1 | 10/2007 | Taneda et al. |
| 2007/0260855 A1 | 11/2007 | Gschwind et al. |
| 2007/0271404 A1 | 11/2007 | Dearth et al. |
| 2007/0271564 A1 | 11/2007 | Anand et al. |
| 2007/0282838 A1 | 12/2007 | Shavit et al. |
| 2007/0283357 A1 | 12/2007 | Jeter et al. |
| 2007/0300227 A1 | 12/2007 | Mall et al. |
| 2008/0016374 A1 | 1/2008 | Gee et al. |
| 2008/0034146 A1 | 2/2008 | Duncan et al. |
| 2008/0034190 A1 | 2/2008 | Rodgers et al. |
| 2008/0098208 A1 | 4/2008 | Reid et al. |

| | | |
|---|---|---|
| 2008/0104223 A1 | 5/2008 | D'Amora et al. |
| 2008/0126764 A1 | 5/2008 | Wu et al. |
| 2008/0127202 A1* | 5/2008 | Stall ............................ 719/313 |
| 2008/0141012 A1 | 6/2008 | Yehia et al. |
| 2008/0148259 A1 | 6/2008 | Hankins et al. |
| 2008/0177985 A1 | 7/2008 | Sandham et al. |
| 2008/0209422 A1 | 8/2008 | Coha |
| 2008/0263321 A1 | 10/2008 | Le et al. |
| 2008/0282056 A1* | 11/2008 | Bond ............................ 711/207 |
| 2009/0037927 A1 | 2/2009 | Sangili et al. |
| 2009/0125913 A1 | 5/2009 | Bradford et al. |
| 2009/0132796 A1* | 5/2009 | Snyder et al. .................. 712/229 |
| 2009/0144519 A1* | 6/2009 | Codrescu et al. ............. 711/207 |
| 2009/0199028 A1 | 8/2009 | Arimilli et al. |
| 2009/0199029 A1 | 8/2009 | Arimilli et al. |
| 2009/0199183 A1 | 8/2009 | Arimilli et al. |
| 2009/0199184 A1 | 8/2009 | Arimilli et al. |
| 2009/0199189 A1 | 8/2009 | Arimilli et al. |
| 2009/0199197 A1 | 8/2009 | Arimilli et al. |
| 2010/0107166 A1 | 4/2010 | Topaloglu |
| 2010/0268790 A1 | 10/2010 | Arimilli et al. |
| 2010/0268791 A1 | 10/2010 | Arimilli et al. |
| 2010/0268915 A1 | 10/2010 | Arimilli et al. |
| 2010/0269115 A1 | 10/2010 | Arimilli et al. |
| 2010/0287341 A1 | 11/2010 | Arimilli et al. |
| 2010/0293340 A1 | 11/2010 | Arimilli et al. |
| 2010/0293341 A1 | 11/2010 | Arimilli et al. |
| 2011/0173417 A1 | 7/2011 | Arimilli et al. |
| 2011/0173419 A1 | 7/2011 | Arimilli et al. |
| 2011/0173423 A1 | 7/2011 | Arimilli et al. |
| 2011/0173593 A1 | 7/2011 | Arimilli et al. |
| 2011/0173625 A1 | 7/2011 | Arimilli et al. |
| 2011/0173630 A1 | 7/2011 | Arimilli et al. |
| 2011/0173631 A1 | 7/2011 | Arimilli et al. |
| 2011/0173632 A1 | 7/2011 | Arimilli et al. |

OTHER PUBLICATIONS

U.S. Appl. No. 12/024,705, filed Feb. 1, 2008, Arimilli et al.
U.S. Appl. No. 12/024,419, filed Feb. 1, 2008, Arimilli et al.
U.S. Appl. No. 12/024,508, filed Feb. 1, 2008, Arimilli et al.
U.S. Appl. No. 12/024,364, filed Feb. 1, 2008, Arimilli et al.
U.S. Appl. No. 12/024,384, filed Feb. 1, 2008, Arimilli et al.
U.S. Appl. No. 12/024,479, filed Feb. 1, 2008, Arimilli et al.
U.S. Appl. No. 12/024,250, filed Feb. 1, 2008, Arimilli et al.
U.S. Appl. No. 12/024,327, filed Feb. 1, 2008, Arimilli et al.
U.S. Appl. No. 12/024,242, filed Feb. 1, 2008, Arimilli et al.
U.S. Appl. No. 12/024,204, filed Feb. 1, 2008, Arimilli et al.
U.S. Appl. No. 12/024,540, filed Feb. 1, 2008, Arimilli et al.
U.S. Appl. No. 12/024,466, filed Feb. 1, 2008, Arimilli et al.
U.S. Appl. No. 12/024,703, filed Feb. 1, 2008, Arimilli et al.
U.S. Appl. No. 12/024,507, filed Feb. 1, 2008, Arimilli et al.
U.S. Appl. No. 12/024,347, filed Feb. 1, 2008, Arimilli et al.
U.S. Appl. No. 12/024,669, filed Feb. 1, 2008, Arimilli et al.
U.S. Appl. No. 12/144,011, filed Jun. 23, 2008, Arimilli et al.
Li, Jian et al., "The Thrifty Barrier: Energy-Aware Synchronization in Shared-Memory Multiprocessors", International Symposium on High-Performance Computer Architecture (HPCA), Madrid, Spain, Feb. 2004, 11 pages.
Lu, Jiwei et al., "Design and Implementation of a Lightweight Dynamic Optimization System", Journal of Instruction-Level Parallelism, Apr. 2004, pp. 1-24.
Marcuello, Pedro et al., "Thread-Spawning Schemes for Speculative Multithreading", Proceedings of the Eighth International Symposium on High-Performance Computer Architecture (HPCA '02), 1503-0897/02, 2002, 10 pages.
Martinez, Jose F. et al., "Speculative Synchronization: Applying Thread-Level Speculation to Explicitly Parallel Applications", Proceedings of the 10th International Conference on Architectural Support for Programming Languages and Operating Systems, Oct. 2002, pp. 18-29.
Monod, Maxime et al., "Looking Ahead in Open Multithreaded Transactions", Proceedings of the Ninth IEEE International Symposium on Object and Component-Oriented Real-Time Distributed Computing 0-7695-2561-X/06, 2006, 11 pages.

Naik, Mayur et al., "Conditional Must Not Aliasing for Static Race Detection", ACM SIGPLAN notices, vol. 42, Issue 1, POPL '07, Jan. 17-19, 2007, pp. 327-338.
Sassone, Peter G. et al., "On the Extraction and Analysis of Prevalent Dataflow Patterns", IEEE International Workshop on Workload Characterization, Oct. 2004, pp. 11-18.
Schmidt, Douglas C., "Scoped Locking", Siemens AG 1999, pp. 1-8.
Sinharoy, B et al., "Power5 system microarchitecture", IBM J. Res. & Dev., vol. 49, No. 4/5, Jul./Sep. 2005, pp. 505-521.
Vinoski, Steve, "Concurrency with Erlang", http://www.computer.org/portal/site/dsonline/menuitem.9ed3d9924aeb0dcd82cc c6716bbe36ec/index.jsp?&pName=dso_level1&path=dsonline/2007/10&file=w5tow.xml&xsl=article.xsl&, IEEE Internet Computing, vol. 11, Sep.-Oct. 2007, 6 pages.
Weissman, Boris, "Active Threads: an Extensible and Portable Light-Weight Thread System", International Computer Science Institute, TR-97-036, Sep. 1997, 80 pages.
"64-bit Intel Xeon Processor with 800 MHz System Bus (1 MB and 2MB L2 Cache Versions)", Jun. 2006, 46 pages.
"Using Spin-Loops on Intel Pentium 4 Processor and Intel Xeon Processor", Version 2.1, Order No. 248674-002, May 24, 2001, pp. 1-11.
Akkary, Haitham et al., "A Dynamic Multithreading Processor", Microarchitecture, 1998, MICRO-31, Proceedings, 31st Annual ACM/IEEE International Symposium on Nov. 30-Dec. 2, 1998. pp. 226-236.
Bik, Aart J. et al., "Automatic Detection of Saturation and Clipping Idioms", Languages and Compliers for Parallel Computing, 15th Workshop, vol. 2481, Jul. 2002, pp. 61-74.
Buntinas, D. et al., "Optimizing Synchronization Operations for Remote Memory Communication Systems", Proceedings of the International Parallel and Distributed Processing Symposium, Apr. 2003, 8 pages.
Grossman, Dan, "Type-Safe Multithreading in Cyclone", ACM SIGPLAN notices, vol. 38, issue 3, TLDI '03, Jan. 18, 2003, 13 pages.
Haight, Jeff et al., "Bus Request-Response Trace for a SMART Interconnect System", First Silicon Solutions Division of MIPS Technologies Inc., and Mobileye Vision Technologies Ltd., 2006, pp. 1-6.
Hovemeyer, David et al., "Atomic Instructions in Java", ECOOP 2002-Object Oriented Programming, 16th European Conference, vol. 2374, Jun. 2002, 22 pages.
Jidin, Razali, "Extending the Thread Programming Model Across Hybrid FPGA/CPU Architectures", Information Technology and Telecommunications Center (ITTC), University of Kansas; Apr. 15, 2005; 39 pages.
Kawahito, Motohiro et al., "A New Idiom Recognition Framework for Exploiting Hardware-Assist Instructions", Computer Architecture News, vol. 34, No. 5, Dec. 2006, pp. 382-393.
Kotlyar, Vladimir et al., "Detecting Overlow Detection", International Conference on Hardware/Software Codesign and Systems Synthesis, Sep. 2004, pp. 36-41.
U.S. Appl. No. 12/024,540.
U.S. Appl. No. 12/024,669.
U.S. Appl. No. 12/024,703.
U.S. Appl. No. 12/024,705.
U.S. Appl. No. 12/024,797.
U.S. Appl. No. 12/144,011.
U.S. Appl. No. 12/424,952.
U.S. Appl. No. 12/424,983.
U.S. Appl. No. 12/425,023.
U.S. Appl. No. 12/425,057.
U.S. Appl. No. 12/024,466.
U.S. Appl. No. 12/024,204.
U.S. Appl. No. 12/024,242.
U.S. Appl. No. 12/024,250.
U.S. Appl. No. 12/024,327.
U.S. Appl. No. 12/024,347.
U.S. Appl. No. 12/024,364.
U.S. Appl. No. 12/024,384.
U.S. Appl. No. 12/024,419.
U.S. Appl. No. 12/024,479.

U.S. Appl. No. 12/024,507.
U.S. Appl. No. 12/024,508.
Office Action mailed Nov. 5, 2010 for U.S. Appl. No. 12/024,242; 20 pages.
Office Action mailed Nov. 12, 2010 for U.S. Appl. No. 12/024,250; 20 pages.
Response to Office Action filed with the USPTO on Dec. 17, 2010 for U.S. Appl. No. 12/024,540; 14 pages.
Final Office Action dated Jul. 1, 2011 for U.S. Appl. No. 12/424,983; 26 pages.
Interview Summary mailed Jun. 27, 2011 for U.S. Appl. No. 12/024,242; 3 pages.
Interview Summary mailed Aug. 2, 2011 for U.S. Appl. No. 12/024,204; 3 pages.
Office Action mailed May 6, 2011 for U.S. Appl. No. 12/024,204; 26 pages.
Office Action mailed May 25, 2011 U.S. Appl. No. 12/024,479; 22 pages.
Office Action mailed Jun. 1, 2011 for U.S. Appl. No. 12/424,952; 33 pages.
Office Action mailed Jun. 30, 2011 for U.S. Appl. No. 12/024,384; 30 pages.
Office Action mailed Jul. 7, 2011 for U.S. Appl. No. 12/425,057; 29 pages.
Office Action mailed Aug. 1, 2011 for U.S. Appl. No. 12/024,705; 27 pages.
Office Action mailed Aug. 1, 2011 for U.S. Appl. No. 12/144,011; 28 pages.
Office Action mailed on Jul. 7, 2011 for U.S. Appl. No. 12/024,327; 27 pages.
Office Communication—Decision on Inventorship dated Jun. 15, 2011 for U.S. Appl. No. 12/424,983; 4 pages.
Response to Final Office Action filed with the USPTO on Jul. 12, 2011, U.S. Appl. No. 12/024,242, 12 pages.
Response to Office Action filed with USPTO on Jun. 2, 2011 for U.S. Appl. No. 12/024,540, 14 pages.
Response to Office Action filed with the USPTO on Jun. 3, 2011 for U.S. Appl. No. 12/425,023, 17 pages.
"The Authoritative Dictionary of IEEE Standards Terms", Seventh Edition, IEEE Press, 2000, pp. 1234-1235.
Lee, Yui-Wah, "Operation-based Update Propagation in a Mobile File System", The Chinese University of Hong Kong, Jan. 2000, 204 pages.
Final Office Action mailed Apr. 12, 2011 for U.S. Appl. No. 12/024,242; 12 pages.
Notice of Allowance mailed Apr. 29, 2011 for U.S. Appl. No. 12/024,250; 6 pages.
Office Action mailed Feb. 3, 2011 for U.S. Appl. No. 12/424,983; 30 pages.
Office Action mailed Mar. 2, 2011 for U.S. Appl. No. 12/024,540; 14 pages.
Office Action mailed Mar. 3, 2011 for U.S. Appl. No. 12/425,023; 36 pages.
Response to Office Action filed Feb. 7, 2011, U.S. Appl. No. 12/024,242, 12 pages.
Response to Office Action filed Feb. 11, 2011, U.S. Appl. No. 12/024,250, 6 pages.
Interview Summary mailed Oct. 12, 2011 for U.S. Appl. No. 12/424,983; 4 pages.
Notice of Allowance mailed Aug. 12, 2011 for U.S. Appl. No. 12/425,023; 28 pages.
Notice of Allowance mailed Oct. 18, 2011 for U.S. Appl. No. 12/024,204; 8 pages.
Notice of Allowance mailed Oct. 20, 2011 for U.S. Appl. No. 12/024,242; 9 pages.
Office Action mailed Aug. 3, 2011 for U.S. Appl. No. 12/024,347; 30 pages.
Office Action mailed Aug. 5, 2011 for U.S. Appl. No. 12/024,797; 33 pages.
Office Action mailed Aug. 15, 2011 for U.S. Appl. No. 12/024,466; 37 pages.
Office Action mailed Aug. 17, 2011 for U.S. Appl. No. 12/024,669; 26 pages.
Office Action mailed Aug. 25, 2011 for U.S. Appl. No. 12/024,540; 16 pages.
Office Action mailed Sep. 30, 2011 for U.S. Appl. No. 12/024,703; 24 pages.
Office Action mailed Oct. 17, 2011 for U.S. Appl. No. 12/024,507; 30 pages.
Office Action mailed Oct. 19, 2011 for U.S. Appl. No. 12/024,364; 53 pages.
Response to Final Office Action filed Aug. 11, 2011, U.S. Appl. No. 12/024,242, 13 pages.
Response to Final Office Action filed Sep. 29, 2011, U.S. Appl. No. 12/424,983, 10 pages.
Response to Office Action filed Aug. 8, 2011, U.S. Appl. No. 12/024,204, 15 pages.
Response to Office Action filed Aug. 25, 2011, U.S. Appl. No. 12/024,479, 12 pages.
Response to Office Action filed Sep. 1, 2011, U.S. Appl. No. 12/424,952, 21 pages.
Response to Office Action filed Sep. 30, 2011, U.S. Appl. No. 12/024,834, 15 pages.
Response to Office Action filed Oct. 4, 2011, U.S. Appl. No. 12/425,057, 21 pages.
Response to Office Action filed Oct. 6, 2011, U.S. Appl. No. 12/024,327, 20 pages.
Terminal Disclaimer filed Aug. 8, 2011, U.S. Appl. No. 12/024,204, 15 pages.
Krishnan, Venkat et al., "A Chip-Multiprocessor Architecture with Speculative Multithreading", IEEE Transactions on Computers, vol. 48, No. 9, pp. 866-880, Sep. 1999, doi:10.1109/12.795218.
McCool, Michael D., "Scalable Progreamming Models for Massively Multicore Processors", IEEE, Proceedings of the IEEE, vol. 96, No. 5, May 2008, pp. 816-831.
Rinard, Martin C. et al., "Jade: A High-Level Machine-Independent Language for Parallel Programming", IEEE, Computer, vol. 26, Issue 6, 1993, pp. 28-28.
Final Office Action dated Nov. 4, 2011 for U.S. Appl. No. 12/024,479; 22 pages.
Final Office Action dated Dec. 6, 2011 for U.S. Appl. No. 12/024,327; 25 pages.
Final Office Action dated Dec. 13, 2011 for U.S. Appl. No. 12/425,057; 24 pages.
Final Office Action dated Dec. 21, 2011 for U.S. Appl. No. 12/024,797; 30 pages.
Final Office Action dated Dec. 22, 2011 for U.S. Appl. No. 12/024,466; 28 pages.
Final Office Action mailed Nov. 22, 2011 for U.S. Appl. No. 12/424,952; 31 pages.
Final Office Action mailed Dec. 21, 2011 for U.S. Appl. No. 12/144,011; 25 pages.
Final Office Action mailed Dec. 22, 2011 for U.S. Appl. No. 12/024,705; 22 pages.
First Office Action dated Jan. 9, 2012 for U.S. Appl. No. 12/024,508; 36 pages.
First Office Action dated Nov. 25, 2011 for U.S. Appl. No. 12/024,419; 32 pages.
Interview Summary mailedDec. 15, 2011 for U.S. Appl. No. 12/024,479; 3 pages.
Notice of Allowance dated Nov. 21, 2011 for U.S. Appl. No. 12/424,983; 16 pages.
Notice of Allowance dated Dec. 8, 2011 for U.S. Appl. No. 12/024,669; 8 pages.
Response to Office Action filed Jan. 18, 2012, U.S. Appl. No. 12/024,364, 19 pages.
Response to Office Action filed Nov. 7, 2011 for U.S. Appl. No. 12/024,797, 14 pages.
Response to Office Action filed Nov. 15, 2011, U.S. Appl. No. 12/024,466, 15 pages.
Response to Office Action filed Nov. 16, 2011, U.S. Appl. No. 12/024,669, 9 pages.
Response to Office Action filed Nov. 22, 2011, U.S. Appl. No. 12/024,540, 13 pages.
Response to Office Action filed Dec. 16, 2011, U.S. Appl. No. 12/024,703, 14 pages.

Response to Office Action filed with the USPTO on Jan. 13, 2012 for U.S. Appl. No. 12/024,507, 20 pages.
Response to Office Action filed with the USPTO on Oct. 26, 2011 for U.S. Appl. No. 12/024,705, 13 pages.
Response to Office Action filed with the USPTO on Oct. 31, 2011 for U.S. Appl. No. 12/024,347, 10 pages.
Response to Office Action filed with the USPTO on Oct. 31, 2011 for U.S. Appl. No. 12/144,011, 14 pages.
Final Office Action mailed Jan. 25, 2012 for U.S. Appl. No. 12/024,364, 30 pages.
Final Office Action mailed Mar. 13, 2012 for U.S. Appl. No. 12/024,507, 21 pages.
Final Office Action mailed Mar. 27, 2012 for U.S. Appl. No. 12/024,384, 25 pages.
Interview Summary mailed Feb. 3, 2012 for U.S. Appl. No. 12/024,327, 3 pages.
Interview Summary mailed Feb. 3, 2012 for U.S. Appl. No. 12/424,952, 4 pages.
Interview Summary mailed Feb. 3, 2012 for U.S. Appl. No. 12/425,057, 3 pages.
Interview Summary mailed Mar. 6, 2012 for U.S. Appl. No. 12/024,797, 7 pages.
Interview Summary mailed Mar. 12, 2012 for U.S. Appl. No. 12/144,011, 6 pages.
Interview Summary mailed Apr. 3, 2012; U.S. Appl. No. 12/024,364, 3 pages.
Notice of Allowance dated Mar. 1, 2012 for U.S. Appl. No. 12/024,479, 11 pages.
Notice of Allowance dated Mar. 15, 2012 for U.S. Appl. No. 12/425,057, 9 pages.
Office Action mailed Feb. 1, 2012 for U.S. Appl. No. 12/024,347, 29 pages.
Office Action mailed Mar. 22, 2012 for U.S. Appl. No. 12/024,540, 19 pages.
Office Action mailed Mar. 23, 2012 for U.S. Appl. No. 12/024,703, 13 pages.
Response to Final Office Action filed Feb. 3, 2012, U.S. Appl. No. 12/024,479, 15 pages.
Response to Final Office Action filed Feb. 29, 2012, U.S. Appl. No. 12/425,057, 12 pages.
Response to Final Office Action filed Mar. 21, 2012, U.S. Appl. No. 12/024,797, 16 pages.
Response to Final Office Action filed Mar. 21, 2012, U.S. Appl. No. 12/144,011, 15 pages.
Response to Final Office Action filed Mar. 22, 2012, U.S. Appl. No. 12/024,466, 23 pages.
Response to Final Office Action filed Mar. 22, 2012, U.S. Appl. No. 12/024,705, 15 pages.
Response to Final Office Action filed with the USPTO on Feb. 21, 2012 for U.S. Appl. No. 12/424,952, 21 pages.
Response to Office Action filed Feb. 27, 2012, U.S. Appl. No. 12/024,419, 20 pages.
Response to Office Action filed Apr. 9, 2012, U.S. Appl. No. 12/024,508, 15 pages.
Eyerman, Stijn et al., "A Memory-Level Parallelism Aware Fetch Policy for SMT Processors", IEEE, 2007, pp. 240-249.

* cited by examiner

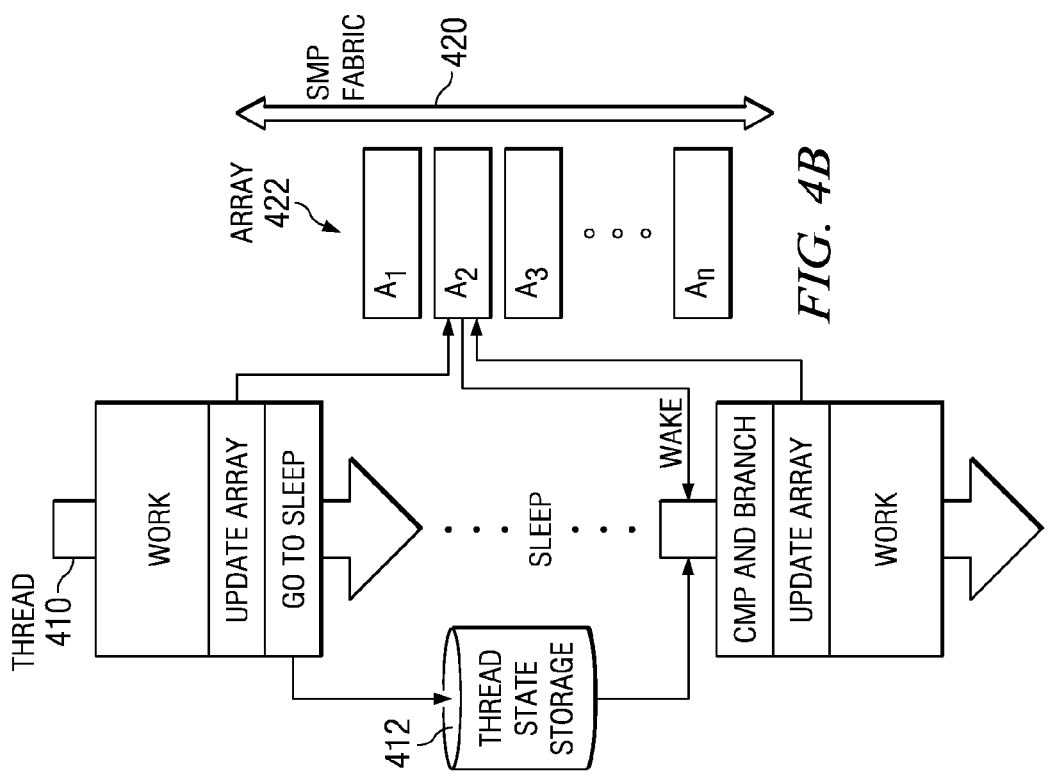
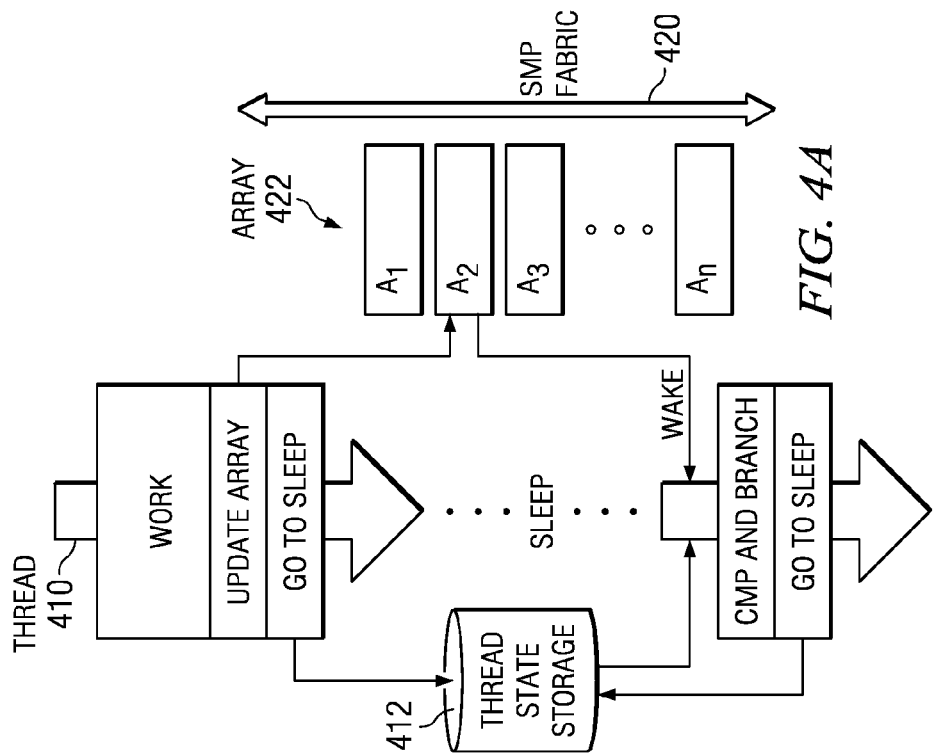

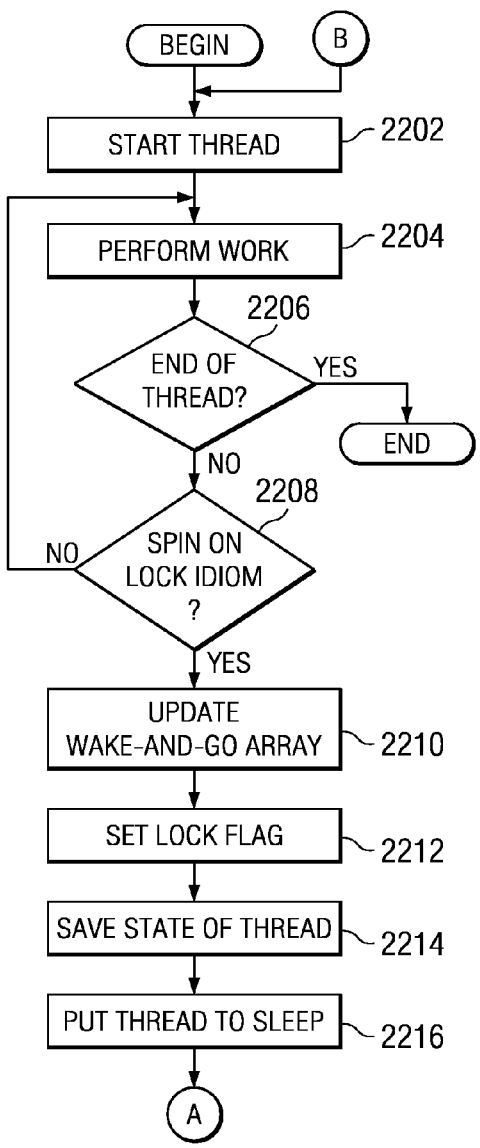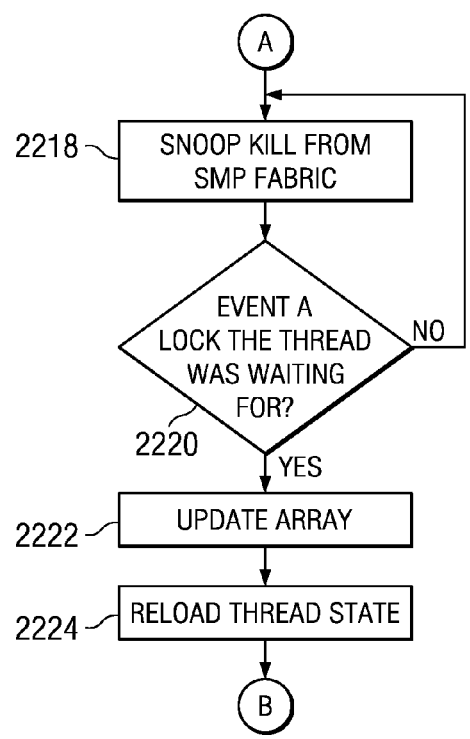
FIG. 22A
FIG. 22B

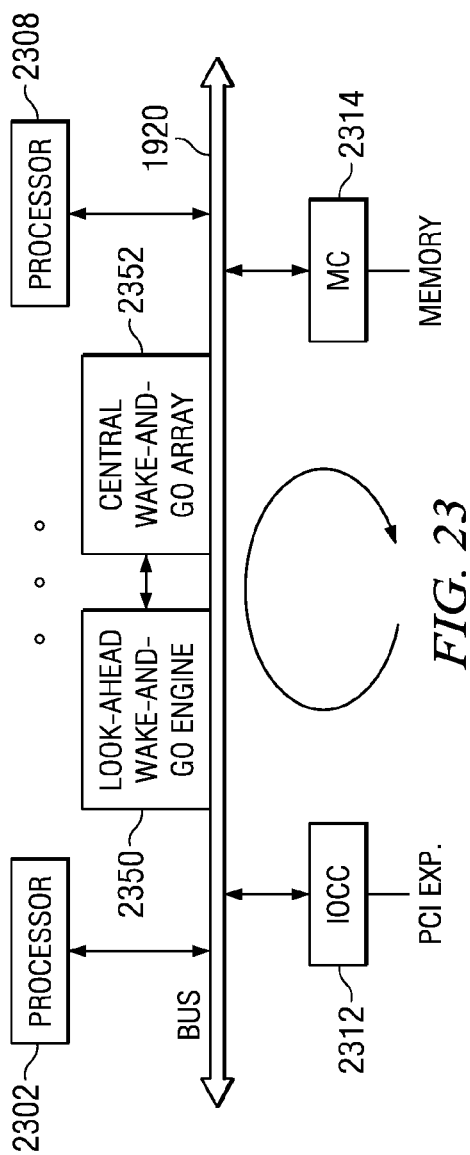

HARDWARE WAKE-AND-GO MECHANISM FOR A DATA PROCESSING SYSTEM

This invention was made with United States Government support under Agreement No. HR0011-07-9-0002 awarded by DARPA. The Government has certain rights in the invention.

BACKGROUND

1. Technical Field

The present application relates generally to an improved data processing system and method. More specifically, the present application is directed to a mechanism to wake a sleeping thread based on an asynchronous event.

2. Description of Related Art

Multithreading is multitasking within a single program. Multithreading allows multiple streams of execution to take place concurrently within the same program, each stream processing a different transaction or message. In order for a multithreaded program to achieve true performance gains, it must be run in a multitasking or multiprocessing environment, which allows multiple operations to take place.

Certain types of applications lend themselves to multithreading. For example, in an order processing system, each order can be entered independently of the other orders. In an image editing program, a calculation-intensive filter can be performed on one image, while the user works on another. Multithreading is also used to create synchronized audio and video applications.

In addition, a symmetric multiprocessing (SMP) operating system uses multithreading to allow multiple CPUs to be controlled at the same time. An SMP computing system is a multiprocessing architecture in which multiple central processing units (CPUs) share the same memory. SMP speeds up whatever processes can be overlapped. For example, in a desktop computer, SMP may speed up the running of multiple applications simultaneously. If an application is multithreaded, which allows for concurrent operations within the application itself, then SMP may improve the performance of that single application.

If a process, or thread, is waiting for an event, then the process goes to sleep. A process is said to be "sleeping," if the process is in an inactive state. The thread remains in memory, but is not queued for processing until an event occurs. Typically, this event is detected when there is a change to a value at a particular address or when there is an interrupt.

As an example of the latter, a processor may be executing a first thread, which goes to sleep. The processor may then begin executing a second thread. When an interrupt occurs, indicating that an event for which the first thread was waiting, the processor may then stop running the second thread and "wake" the first thread. However, in order to receive the interrupt, the processor must perform interrupt event handling, which is highly software intensive. An interrupt handler has multiple levels, typically including a first level interrupt handler (FLIH) and a second level interrupt handler (SLIH); therefore, interrupt handling may be time-consuming.

In the former case, the processor may simply allow the first thread to periodically poll a memory location to determine whether a particular event occurs. The first thread performs a get instruction and a compare instruction (GET&CMP) to determine whether a value at a given address is changed to an expected value. When one considers that a computing system may be running thousands of threads, many of which are waiting for an event at any given time, there are many wasted processor cycles spent polling memory locations when an expected event has not occurred.

SUMMARY

In one illustrative embodiment, a method, in a data processing system, performs a wake-and-go operation. The method comprises detecting, by a hardware wake-and-go mechanism within a processor, a thread that is waiting for an event that modifies a data value associated with a target address. The method further comprises populating, by the hardware wake-and-go mechanism, a wake-and-go storage array with the target address. The method comprises placing the thread in a sleep state. Responsive to the event that modifies the data value associated with the target address, the method determines whether to wake the thread. In response to a determination that the thread is to be awoken, the method places the thread in a non-sleep state.

In another illustrative embodiment, a data processing system comprises a hardware wake-and-go mechanism and a wake-and-go array. The hardware wake-and-go mechanism is configured to detect a thread that is waiting for an event that modifies a data value associated with a target address. The hardware wake-and-go mechanism is configured to populate the wake-and-go storage array with the target address and place the thread in a sleep state. Responsive to the event that modifies the data value associated with the target address, the hardware wake-and-go mechanism is configured to determine whether to wake the thread. In response to a determination that the thread is to be awoken, the hardware wake-and-go mechanism is configured to place the thread in a non-sleep state.

In another illustrative embodiment, a hardware wake-and-go mechanism comprises a wake-and-go storage array and wake-and-go logic. The wake-and-go logic is configured to detect a thread that is waiting for an event that modifies a data value associated with a target address. The wake-and-go logic populate the wake-and-go storage array with the target address and place the thread in a sleep state. Responsive to the event that modifies the data value associated with the target address, the wake-and-go logic determine whether to wake the thread. In response to a determination that the thread is to be awoken, the wake-and-go logic place the thread in a non-sleep state.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A and 4B are block diagrams illustrating operation of a wake-and-go mechanism with specialized processor instructions in accordance with an illustrative embodiment;

FIGS. 22A and 22B are flowcharts illustrating parallel lock spinning using a wake-and-go mechanism in accordance with the illustrative embodiments;

FIG. 23 is a block diagram illustrating a wake-and-go engine with a central repository wake-and-go array in a multiple processor system in accordance with an illustrative embodiment;

FIG. 24 illustrates a central repository wake-and-go-array in accordance with an illustrative embodiment;

DETAILED DESCRIPTION OF THE ILLUSTRATIVE EMBODIMENTS

Figure 1:
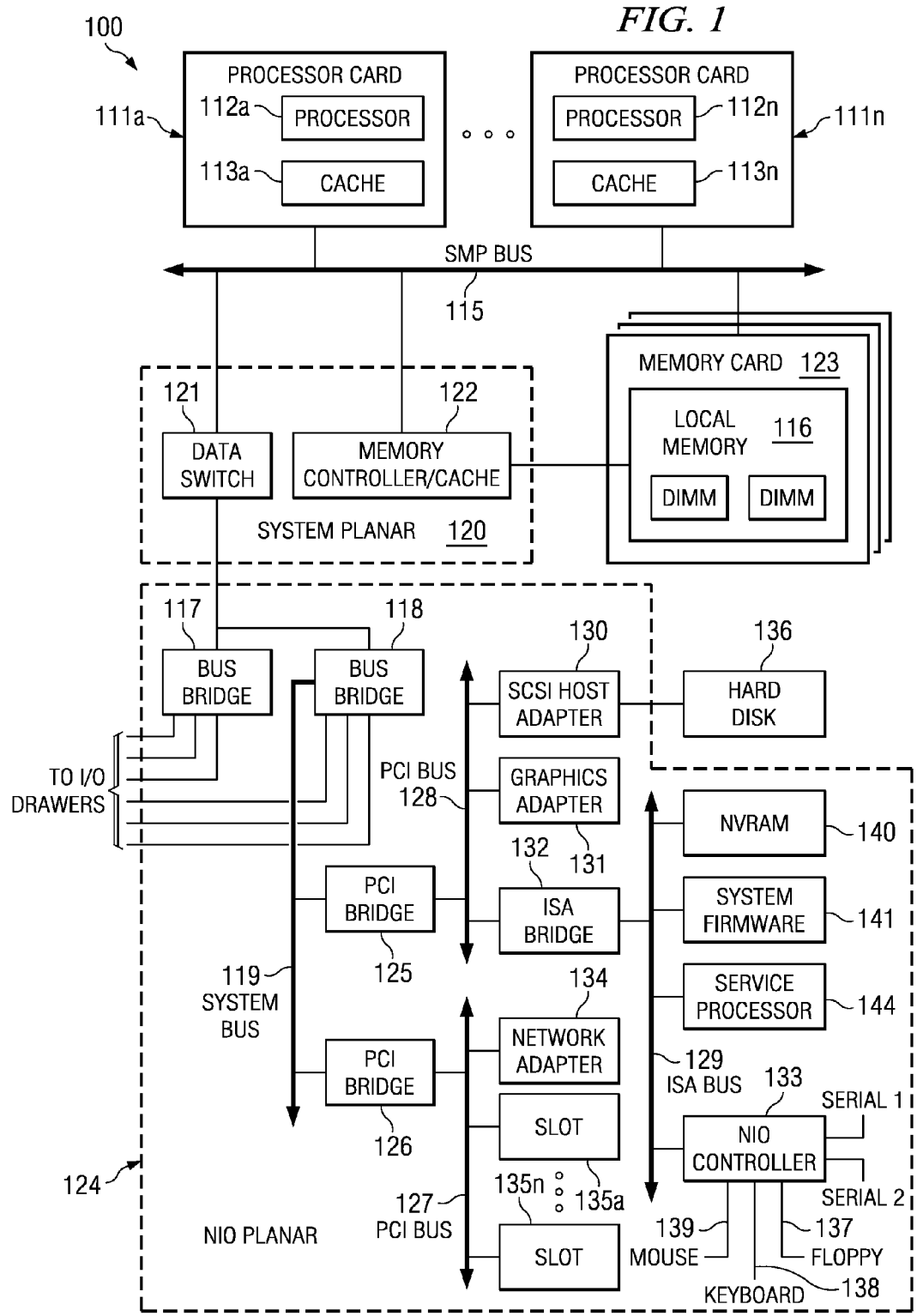
FIG. 1 is a block diagram of an exemplary data processing system in which aspects of the illustrative embodiments may be implemented.

With reference now to the figures and in particular with reference to FIG. 1, an exemplary diagram of data processing environments is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an exemplary data processing system in which aspects of the illustrative embodiments may be implemented. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n connect to symmetric multiprocessing (SMP) bus 115. SMP bus 115 supports a system planar 120 that contains processor cards 111a-111n and memory cards 123. The system planar also contains data switch 121 and memory controller/cache 122. Memory controller/cache 122 supports memory cards 123 that includes local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection 137, keyboard connection 138, and mouse connection 139 are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 also connects to ISA bus 129 for implementing the initial Basic Input/Output System (BIOS) functions. A service processor 144 connects to ISA bus 129 to provide functionality for system diagnostics or system servicing.

The operating system (OS) resides on hard disk 136, which may also provide storage for additional application software for execution by data processing system. NVRAM 140 stores system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system loads into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

FIG. 1 is an example of a symmetric multiprocessing (SMP) data processing system in which processors communicate via a SMP bus 115. FIG. 1 is only exemplary and is not intended to assert or imply any limitation with regard to the environments in which aspects or embodiments of the present invention may be implemented. The depicted environments may be implemented in other data processing environments without departing from the spirit and scope of the present invention.

Figure 2:
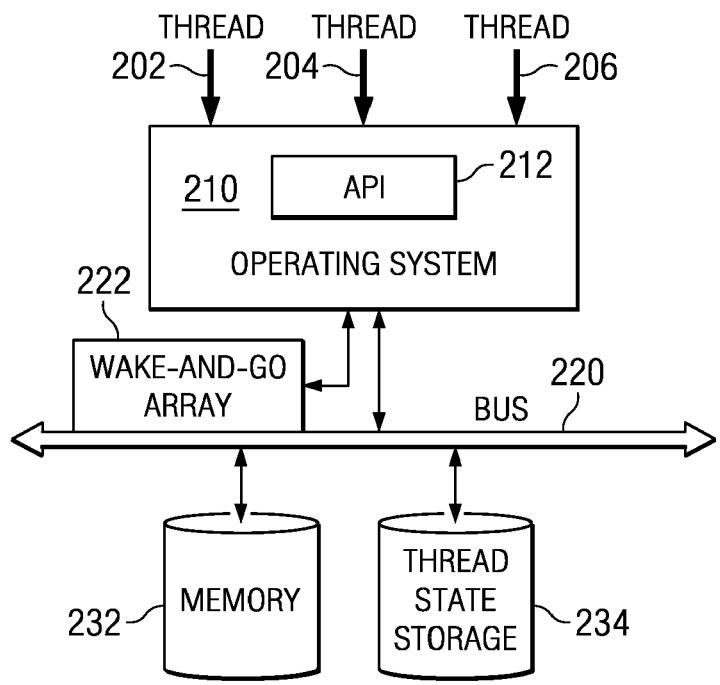
FIG. 2 is a block diagram of a wake-and-go mechanism in a data processing system in accordance with an illustrative embodiment.

FIG. 2 is a block diagram of a wake-and-go mechanism in a data processing system in accordance with an illustrative embodiment. Threads 202, 204, 206 run on one or more processors (not shown). Threads 202, 204, 206 make calls to operating system 210 and application programming interface (API) 212 to communicate with each other, memory 232 via bus 220, or other devices within the data processing system.

In accordance with the illustrative embodiment, a wake-and-go mechanism for a microprocessor includes wake-and-go array 222 attached to the SMP fabric. The SMP fabric is a communication medium through which processors communicate. The SMP fabric may comprise a single SMP bus or a system of busses, for example. In the depicted example, the SMP fabric comprises bus 220. A thread, such as thread 202, for example, may include instructions that indicate that the thread is waiting for an event. The event may be an asynchronous event, which is an event that happens independently in time with respect to execution of the thread in the data processing system. For example, an asynchronous event may be a temperature value reaching a particular threshold, a stock price falling below a given threshold, or the like. Alternatively, the event may be related in some way to execution of the thread. For example, the event may be obtaining a lock for exclusive access to a database record or the like.

Typically, the instructions may comprise a series of get-and-compare sequences; however, in accordance with the illustrative embodiment, the instructions include instructions, calls to operating system 210 or API 212, or calls to a background sleeper thread, such as thread 204, for example, to update wake-and-go array 222. These instructions store a target address in wake-and-go array 222, where the event the thread is waiting for is associated with the target address. After updating wake-and-go array 222 with the target address, thread 202 may go to sleep.

When thread 202 goes to sleep, operating system 210 or other software or hardware saves the state of thread 202 in thread state storage 234, which may be allocated from memory 232 or may be a hardware private array within the processor (not shown) or pervasive logic (not shown). When a thread is put to sleep, i.e., removed from the run queue of a processor, the operating system must store sufficient information on its operating state such that when the thread is again scheduled to run on the processor, the thread can resume operation from an identical position. This state information is sometime referred to as the thread's "context." The state information may include, for example, address space, stack space, virtual address space, program counter, instruction register, program status word, and the like.

If a transaction appears on bus 220 that modifies a value at an address in wake-and-go array 222, then operating system 210 may wake thread 202. Operating system 210 wakes thread 202 by recovering the state of thread 202 from thread state storage 234. Thread 202 may then determine whether the transaction corresponds to the event for which the thread was waiting by performing a get-and-compare operation, for instance. If the transaction is the event for which the thread was waiting, then thread 202 will perform work. However, if the transaction is not the event, then thread 202 will go back to sleep. Thus, thread 202 only performs a get-and-compare operation if there is a transaction that modifies the target address.

Alternatively, operating system 210 or a background sleeper thread, such as thread 204, may determine whether the transaction is the event for which the thread was waiting. Before being put to sleep, thread 202 may update a data structure in the operating system or background sleeper thread with a value for which it is waiting.

In one exemplary embodiment, wake-and-go array 222 may be a content addressable memory (CAM). A CAM is a special type of computer memory often used in very high speed searching applications. A CAM is also known as associative memory, associative storage, or associative array, although the last term is more often used for a programming data structure. Unlike a random access memory (RAM) in which the user supplies a memory address and the RAM returns the data value stored at that address, a CAM is designed such that the user supplies a data value and the CAM searches its entire memory to see if that data value is stored within the CAM. If the data value is found, the CAM returns a list of one or more storage addresses where the data value was found. In some architectures, a CAM may return the data value or other associated pieces of data. Thus, a CAM may be considered the hardware embodiment of what in software terms would be called an associative array.

Thus, in the exemplary embodiment, wake-and-go array 222 may comprise a CAM and associated logic that will be triggered if a transaction appears on bus 220 that modifies an address stored in the CAM. A transaction that modifies a value at a target address may be referred to as a "kill"; thus, wake-and-go array 222 may be said to be "snooping kills." In this exemplary embodiment, the data values stored in the CAM are the target addresses at which threads are waiting for something to be written. The address at which a data value, a given target address, is stored is referred to herein as the storage address. Each storage address may refer to a thread that is asleep and waiting for an event. Wake-and-go array 222 may store multiple instances of the same target address, each instance being associated with a different thread waiting for an event at that target address. Thus, when wake-and-go array 222 snoops a kill at a given target address, wake-and-go array 222 may return one or more storage addresses that are associated with one or more sleeping threads.

In one exemplary embodiment, software may save the state of thread 202, for example. The state of a thread may be about 1000 bytes, for example. Thread 202 is then put to sleep. When wake-and-go array 222 snoops a kill at a given target address, logic associated with wake-and-go array 222 may generate an exception. The processor that was running thread 202 sees the exception and performs a trap. A trap is a type of synchronous interrupt typically caused by an exception condition, in this case a kill at a target address in wake-and-go array 222. The trap may result in a switch to kernel mode, wherein the operating system 210 performs some action before returning control to the originating process. In this case, the trap results in other software, such as operating system 210, for example, to reload thread 202 from thread state storage 234 and to continue processing of the active threads on the processor.

Figure 3:
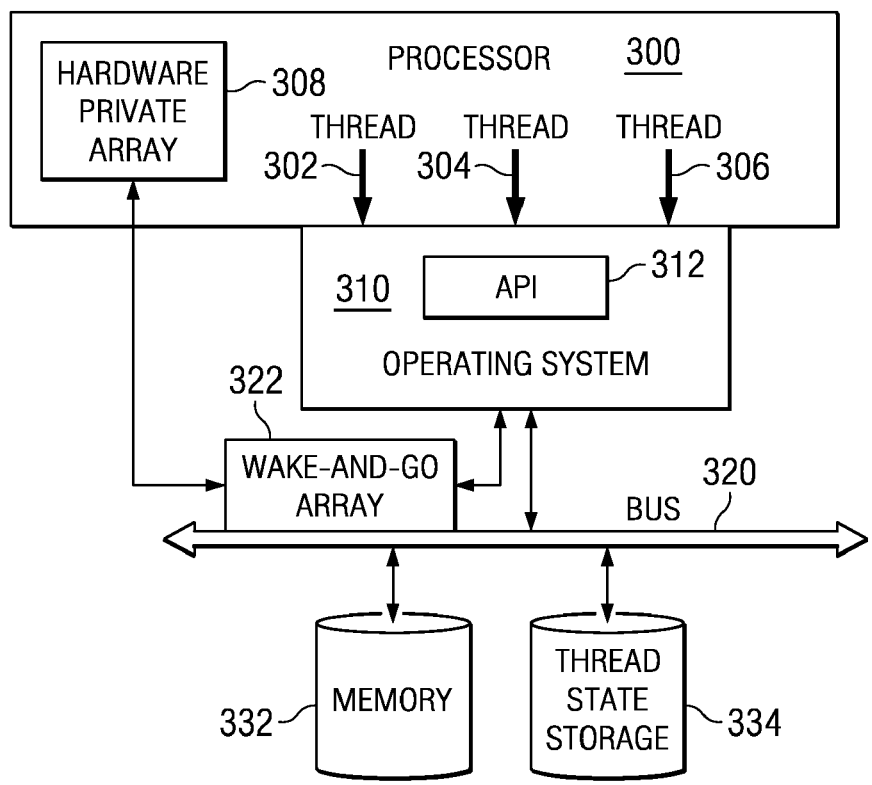
FIG. 3 is a block diagram of a wake-and-go mechanism with a hardware private array in accordance with an illustrative embodiment.

FIG. 3 is a block diagram of a wake-and-go mechanism with a hardware private array in accordance with an illustrative embodiment. Threads 302, 304, 306 run on processor 300. Threads 302, 304, 306 make calls to operating system 310 and application programming interface (API) 312 to communicate with each other, memory 332 via bus 320, or other devices within the data processing system. While the data processing system in FIG. 3 shows one processor, more processors may be present depending upon the implementation where each processor has a separate wake-and-go array or one wake-and-go array stores target addresses for threads for multiple processors.

In an illustrative embodiment, when a thread, such as thread 302, first starts executing, a wake-and-go mechanism automatically allocates space for thread state in hardware private array 308 and space for a target address and other information, if any, in wake-and-go array 322. Allocating space may comprise reserving an address range in a memory, such as a static random access memory, that is hidden in hardware, such as processor 300, for example. Alternatively, if hardware private array 308 comprises a reserved portion of system memory, such as memory 332, then the wake-and-go mechanism may request a sufficient portion of memory, such as 1000 bytes, for example, to store thread state for that thread.

Thus hardware private array 308 may be a memory the size of which matches the size of thread state information for all running threads. When a thread ends execution and is no longer in the run queue of processor 300, the wake-and-go mechanism de-allocates the space for the thread state information for that thread.

In accordance with the illustrative embodiment, a wake-and-go mechanism for a microprocessor includes wake-and-go array 322 attached to the SMP fabric. The SMP fabric is a communication medium through which processors communicate. The SMP fabric may comprise a single SMP bus or a system of busses, for example. In the depicted example, the SMP fabric comprises bus 320. A thread, such as thread 302, for example, may include instructions that indicate that the thread is waiting for an event. The event may be an asynchronous event, which is an event that happens independently in time with respect to execution of the thread in the data processing system. For example, an asynchronous event may be a temperature value reaching a particular threshold, a stock price falling below a given threshold, or the like. Alternatively, the event may be related in some way to execution of the thread. For example, the event may be obtaining a lock for exclusive access to a database record or the like.

Typically, the instructions may comprise a series of get-and-compare sequences; however, in accordance with the illustrative embodiment, the instructions include instructions, calls to operating system 310 or API 312, or calls to a background sleeper thread, such as thread 304, for example, to update wake-and-go array 322. These instructions store a target address in wake-and-go array 322, where the event the thread is waiting for is associated with the target address. After updating wake-and-go array 322 with the target address, thread 302 may go to sleep.

When thread 302 goes to sleep, operating system 310 or other software or hardware within processor 300 saves the state of thread 302 in hardware private array 308 within processor 300. In an alternative embodiment, hardware private array may be embodied within pervasive logic associated with bus 320 or wake-and-go array 322. When a thread is put to sleep, i.e., removed from the run queue of processor 300, operating system 310 must store sufficient information on its operating state such that when the thread is again scheduled to run on processor 300, the thread can resume operation from an identical position. This state information is sometime referred to as the thread's "context." The state information may include, for example, address space, stack space, virtual address space, program counter, instruction register, program status word, and the like, which may comprise about 1000 bytes, for example.

If a transaction appears on bus 320 that modifies a value at an address in wake-and-go array 322, then operating system 310 may wake thread 302. Operating system 310 wakes thread 302 by recovering the state of thread 302 from hardware private array 308. Thread 302 may then determine whether the transaction corresponds to the event for which the thread was waiting by performing a get-and-compare operation, for instance. If the transaction is the event for which the thread was waiting, then thread 302 will perform work. However, if the transaction is not the event, then thread 302 will go back to sleep. Thus, thread 302 only performs a get-and-compare operation if there is a transaction that modifies the target address.

Hardware private array 308 is a thread state storage that is embedded within processor 300 or within logic associated with bus 320 or wake-and-go array 322. Hardware private array 308 may be a memory structure, such as a static random access memory (SRAM), which is dedicated to storing thread state for sleeping threads that have a target address in wake-and-go array 322. In an alternative embodiment, hardware private array 308 may be a hidden area of memory 332. Hardware private array 308 is private because it cannot be addressed by the operating system or work threads.

Hardware private array 308 and/or wake-and-go array 322 may have a limited storage area. Therefore, each thread may have an associated priority. The wake-and-go mechanism described herein may store the priority of sleeping threads with the thread state in hardware private array 308. Alternatively, the wake-and-go mechanism may store the priority with the target address in wake-and-go array 322. When a thread, such as thread 302, for example, goes to sleep, the wake-and-go mechanism may determine whether there is sufficient room to store the thread state of thread 302 in hardware private array 308. If there is sufficient space, then the wake-and-go mechanism simply stores the thread state in hardware private array 308.

If there is insufficient space in hardware private array 308, then if the hardware private array is a portion of system memory 332, then the wake-and-go mechanism may ask for more of system memory 332 to be allocated to the hardware private array 308.

If there is insufficient space in hardware private array 308, then the wake-and-go mechanism may compare the priority of thread 302 to the priorities of the threads already stored in hardware private array 308 and wake-and-go array 322. If thread 302 has a lower priority than all of the threads already stored in hardware private array 208 and wake-and-go array 322, then thread 302 may default to a flee model, such as polling or interrupt as in the prior art. If thread 302 has a higher priority than at least one thread already stored in hardware private array 308 and wake-and-go array 322, then the wake-and-go mechanism may "punt" a lowest priority thread, meaning the thread is removed from hardware private array 308 and wake-and-go array 322 and converted to a flee model.

In an alternative embodiment, priority may be determined by other factors. For example, priority may be time driven. That is, the wake-and-go mechanism may simply punt the stalest thread in hardware private array 308 and wake-and-go array 322.

Alternatively, operating system 310 or a background sleeper thread, such as thread 304, may determine whether the transaction is the event for which the thread was waiting. Before being put to sleep, thread 302 may update a data structure in the operating system or background sleeper thread with a value for which it is waiting.

In one exemplary embodiment, wake-and-go array 322 may be a content addressable memory (CAM). A CAM is a special type of computer memory often used in very high speed searching applications. A CAM is also known as associative memory, associative storage, or associative array, although the last term is more often used for a programming data structure. Unlike a random access memory (RAM) in which the user supplies a memory address and the RAM returns the data value stored at that address, a CAM is designed such that the user supplies a data value and the CAM searches its entire memory to see if that data value is stored within the CAM. If the data value is found, the CAM returns a list of one or more storage addresses where the data value was found. In some architectures, a CAM may return the data value or other associated pieces of data. Thus, a CAM may be considered the hardware embodiment of what in software terms would be called an associative array.

Thus, in the exemplary embodiment, wake-and-go array 322 may comprise a CAM and associated logic that will be triggered if a transaction appears on bus 320 that modifies an address stored in the CAM. A transaction that modifies a value at a target address may be referred to as a "kill"; thus, wake-and-go array 322 may be said to be "snooping kills." In this exemplary embodiment, the data values stored in the CAM are the target addresses at which threads are waiting for something to be written. The address at which a data value, a given target address, is stored is referred to herein as the storage address. Each storage address may refer to a thread that is asleep and waiting for an event. Wake-and-go array 322 may store multiple instances of the same target address, each instance being associated with a different thread waiting for an event at that target address. Thus, when wake-and-go array 322 snoops a kill at a given target address, wake-and-go array 322 may return one or more storage addresses that are associated with one or more sleeping threads.

FIGS. 4A and 4B are block diagrams illustrating operation of a wake-and-go mechanism with specialized processor instructions in accordance with an illustrative embodiment. With particular reference to FIG. 4A, thread 410 runs in a processor (not shown) and performs some work. Thread 410 executes a specialized processor instruction to update wake-and-go array 422, storing a target address $A_2$ in array 422. Then, thread 410 goes to sleep with thread state being stored in thread state storage 412.

When a transaction appears on SMP fabric 420 with an address that matches the target address $A_2$, array 422 returns the storage address that is associated with thread 410. The operating system (not shown) or some other hardware or software then wakes thread 410 by retrieving the thread state information from thread state storage 412 and placing the thread in the run queue for the processor. Thread 410 may then perform a compare-and-branch operation to determine whether the value written to the target address represents the event for which thread 410 is waiting. In the depicted example, the value written to the target address does not represent the event for which thread 410 is waiting; therefore, thread 410 goes back to sleep.

In one exemplary embodiment, software may save the state of thread 410, for example. Thread 410 is then put to sleep. When wake-and-go array 422 snoops a kill at target address $A_2$, logic associated with wake-and-go array 422 may generate an exception. The processor sees the exception and performs a trap, which results in a switch to kernel mode, wherein the operating system may perform some action before returning control to the originating process. In this case, the trap results in other software to reload thread 410 from thread state storage 412 and to continue processing of the active threads on the processor.

In one exemplary embodiment, thread state storage 412 is a hardware private array. Thread state storage 412 is a memory that is embedded within the processor or within logic associated with bus 420 or wake-and-go array 422. Thread state storage 412 may comprise memory cells that are dedicated to storing thread state for sleeping threads that have a target address in wake-and-go array 422. In an alternative embodiment, thread state storage 412 may be a hidden area of memory 332, for example. Thread state storage 412 may private in that it cannot be addressed by the operating system or work threads.

Turning to FIG. 4B, thread 410 runs in a processor (not shown) and performs some work. Thread 410 executes a specialized processor instruction to update wake-and-go array 422, storing a target address $A_2$ in array 422. Then, thread 410 goes to sleep with thread state being stored in thread state storage 412.

When a transaction appears on SMP fabric 420 with an address that matches the target address $A_2$, array 422 returns the storage address that is associated with thread 410. The operating system (not shown) or some other hardware or software then wakes thread 410 by retrieving the thread state information from thread state storage 412 and placing the thread in the run queue for the processor. Thread 410 may then perform a compare-and-branch operation to determine whether the value written to the target address represents the event for which thread 410 is waiting. In the depicted example, the value written to the target address does represent the event for which thread 410 is waiting; therefore, thread 410 updates the array to remove the target address from array 422, and performs more work.

Figure 5A:
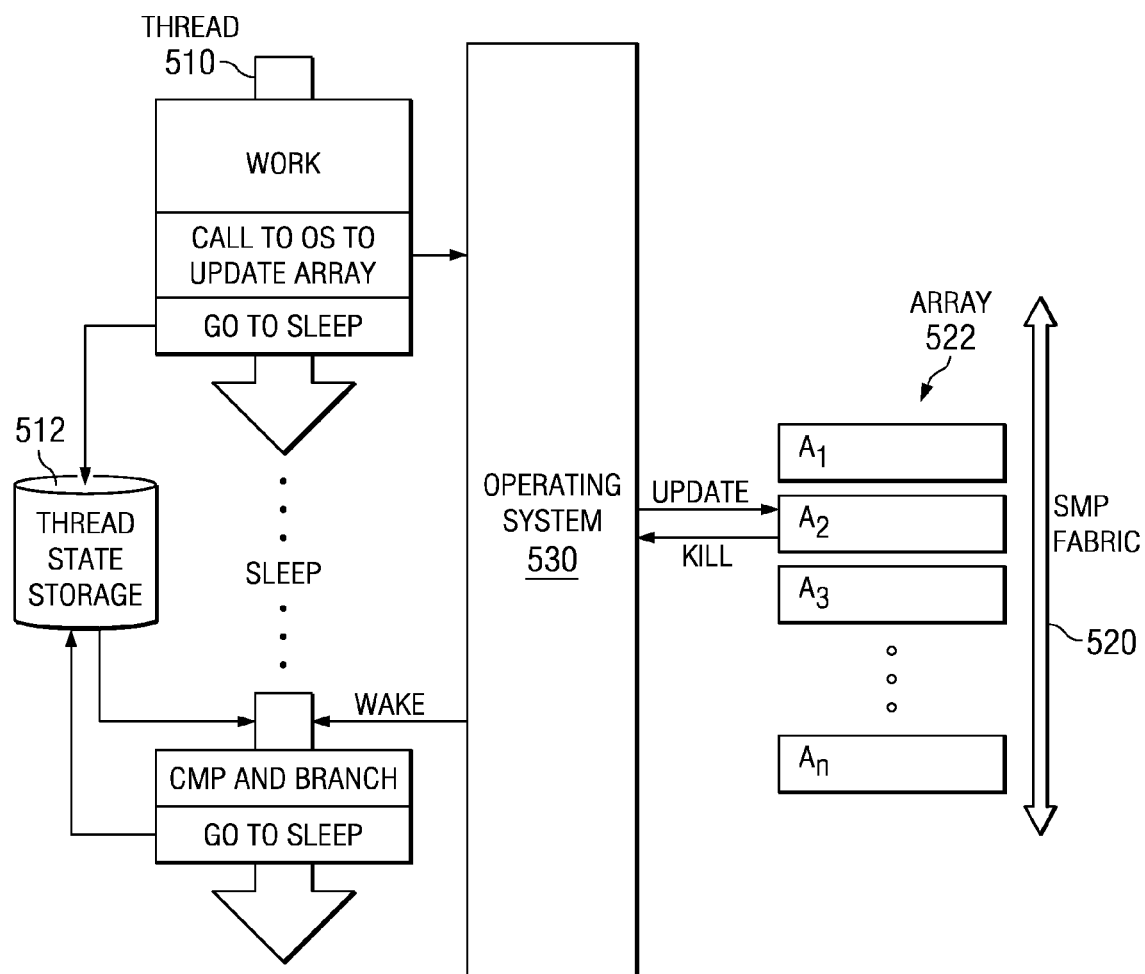
FIGS. 5A and 5B are block diagrams illustrating operation of a wake-and-go mechanism with a specialized operating system call in accordance with an illustrative embodiment.
Figure 5B:
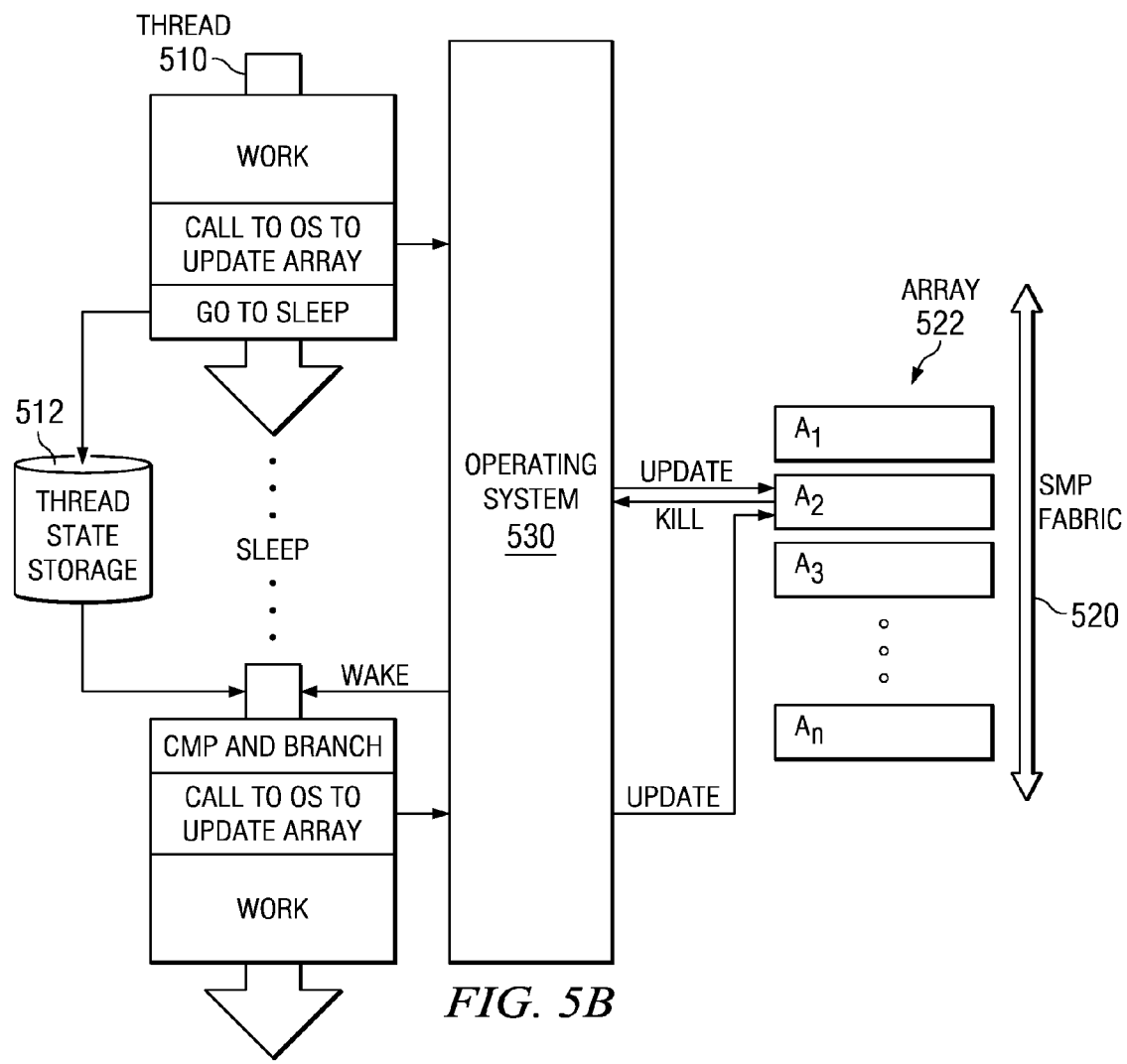

FIGS. 5A and 5B are block diagrams illustrating operation of a wake-and-go mechanism with a specialized operating system call in accordance with an illustrative embodiment. With particular reference to FIG. 5A, thread 510 runs in a processor (not shown) and performs some work. Thread 510 makes a call to operating system 530 to update wake-and-go array 522. The call to operating system 530 may be an operating system call or a call to an application programming interface (not shown) provided by operating system 530.

Operating system 530 then stores a target address $A_2$ in array 522. Then, thread 510 goes to sleep with thread state being stored in thread state storage 512.

When a transaction appears on SMP fabric 520 with an address that matches the target address $A_2$, array 522 returns the storage address that is associated with thread 510. Operating system 530 or some other hardware or software then wakes thread 510 by retrieving the thread state information from thread state storage 512 and placing the thread in the run queue for the processor. Thread 510 may then perform a compare-and-branch operation to determine whether the value written to the target address represents the event for which thread 510 is waiting. In the depicted example, the value written to the target address does not represent the event for which thread 510 is waiting; therefore, thread 510 goes back to sleep.

In one exemplary embodiment, software may save the state of thread 510, for example. Thread 510 is then put to sleep. When wake-and-go array 522 snoops a kill at target address $A_2$, logic associated with wake-and-go array 522 may generate an exception. The processor sees the exception and performs a trap, which results in a switch to kernel mode, wherein operating system 530 may perform some action before returning control to the originating process. In this case, the trap results in the operating system 530 to reload thread 510 from thread state storage 512 and to continue processing of the active threads on the processor.

In one exemplary embodiment, thread state storage 512 is a hardware private array. Thread state storage 512 is a memory that is embedded within the processor or within logic associated with bus 520 or wake-and-go array 522. Thread state storage 512 may comprise memory cells that are dedicated to storing thread state for sleeping threads that have a target address in wake-and-go array 522. In an alternative embodiment, thread state storage 512 may be a hidden area of memory 332, for example. Thread state storage 512 may private in that it cannot be addressed by the operating system or work threads.

Turning to FIG. 5B, thread 510 runs in a processor (not shown) and performs some work. Thread 510 makes a call to operating system 530 to update wake-and-go array 522. The call to operating system 530 may be an operating system call or a call to an application programming interface (not shown) provided by operating system 530. Operating system 530 then stores a target address $A_2$ in array 522. Then, thread 510 goes to sleep with thread state being stored in thread state storage 512.

When a transaction appears on SMP fabric 520 with an address that matches the target address $A_2$, array 522 returns the storage address that is associated with thread 510. Operating system 530 or some other hardware or software then wakes thread 510 by retrieving the thread state information from thread state storage 512 and placing the thread in the run queue for the processor. Thread 510 may then perform a compare-and-branch operation to determine whether the value written to the target address represents the event for which thread 510 is waiting. In the depicted example, the value written to the target address does represent the event for which thread 510 is waiting; therefore, thread 510 updates the array to remove the target address from array 522, and performs more work.

Figure 6:
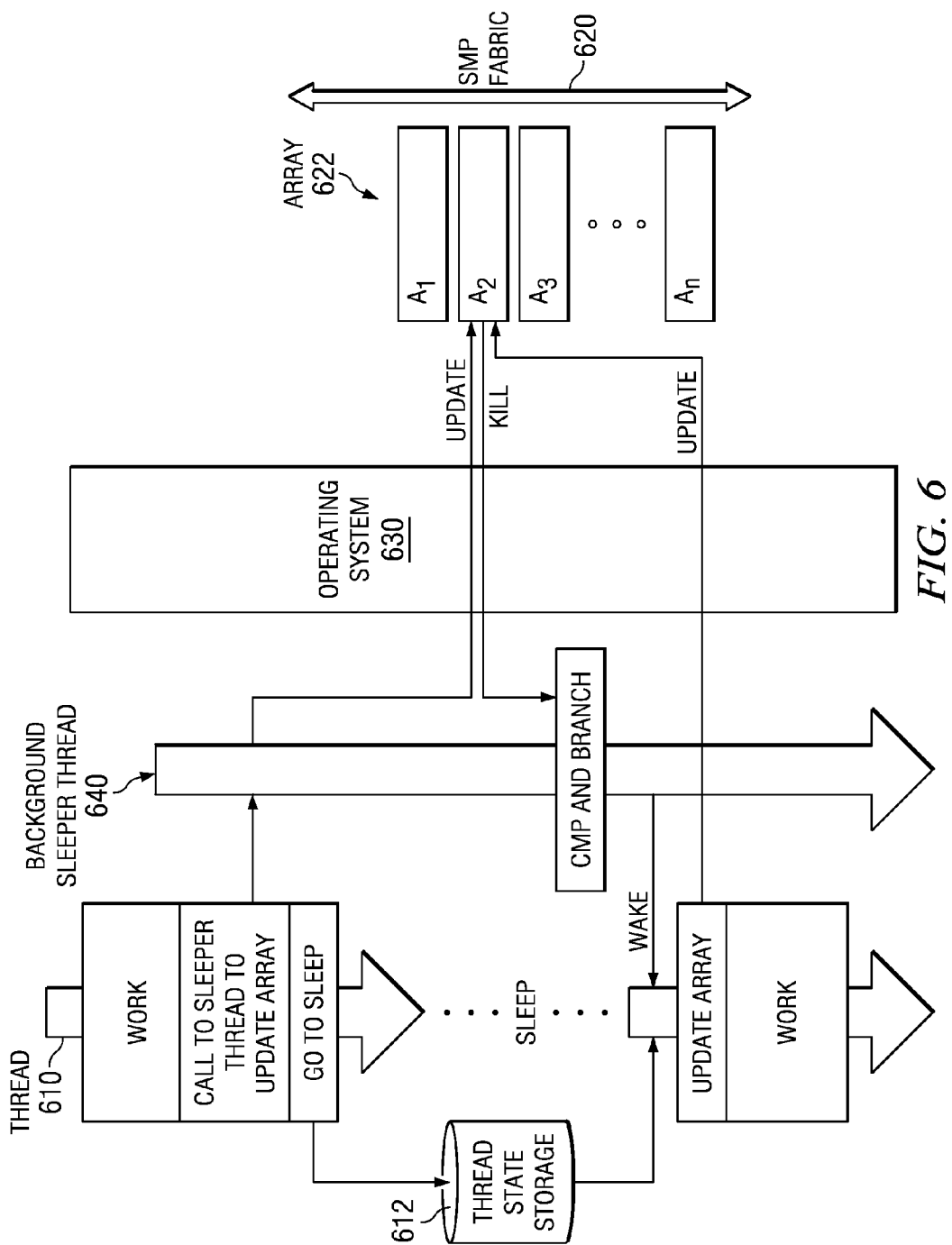
FIG. 6 is a block diagram illustrating operation of a wake-and-go mechanism with a background sleeper thread in accordance with an illustrative embodiment.

FIG. 6 is a block diagram illustrating operation of a wake-and-go mechanism with a background sleeper thread in accordance with an illustrative embodiment. Thread 610 runs in a processor (not shown) and performs some work. Thread 610 makes a call to background sleeper thread 640 to update wake-and-go array 622. The call to background sleeper thread 640 may be a remote procedure call, for example, or a call to an application programming interface (not shown) provided by background sleeper thread 640. Background sleeper thread 640 then stores a target address $A_2$ in array 622. Thread 610 may also store other information in association with background sleeper thread 640, such as a value for which thread 610 is waiting to be written to target address $A_2$. Then, thread 610 goes to sleep with thread state being stored in thread state storage 612.

When a transaction appears on SMP fabric 620 with an address that matches the target address $A_2$, array 622 returns the storage address that is associated with thread 610. Operating system 630 or some other hardware or software then wakes thread 610 by retrieving the thread state information from thread state storage 612 and placing the thread in the run queue for the processor. Background sleeper thread 640 may then perform a compare-and-branch operation to determine whether the value written to the target address represents the event for which thread 610 is waiting. If the value written to the target address does represent the event for which thread 610 is waiting, then background sleeper thread 640 does nothing. However, if the value written to the target address does represent the event for which thread 610 is waiting, then background sleeper thread 640 wakes thread 640. Thereafter, thread 610 updates the array 622 to remove the target address from array 622 and performs more work.

In one exemplary embodiment, software may save the state of thread 610, for example. Thread 610 is then put to sleep. When wake-and-go array 622 snoops a kill at target address $A_2$, logic associated with wake-and-go array 622 may generate an exception. The processor sees the exception and performs a trap, which results in a switch to kernel mode, wherein the operating system may perform some action before returning control to the originating process. In this case, the trap results in other software, such as background sleeper thread 640 to reload thread 610 from thread state storage 612 and to continue processing of the active threads on the processor.

In one exemplary embodiment, thread state storage 612 is a hardware private array. Thread state storage 612 is a memory that is embedded within the processor or within logic associated with bus 620 or wake-and-go array 622. Thread state storage 612 may comprise memory cells that are dedicated to storing thread state for sleeping threads that have a target address in wake-and-go array 622. In an alternative embodiment, thread state storage 612 may be a hidden area of memory 332, for example. Thread state storage 612 may private in that it cannot be addressed by the operating system or work threads.

Figure 7A:
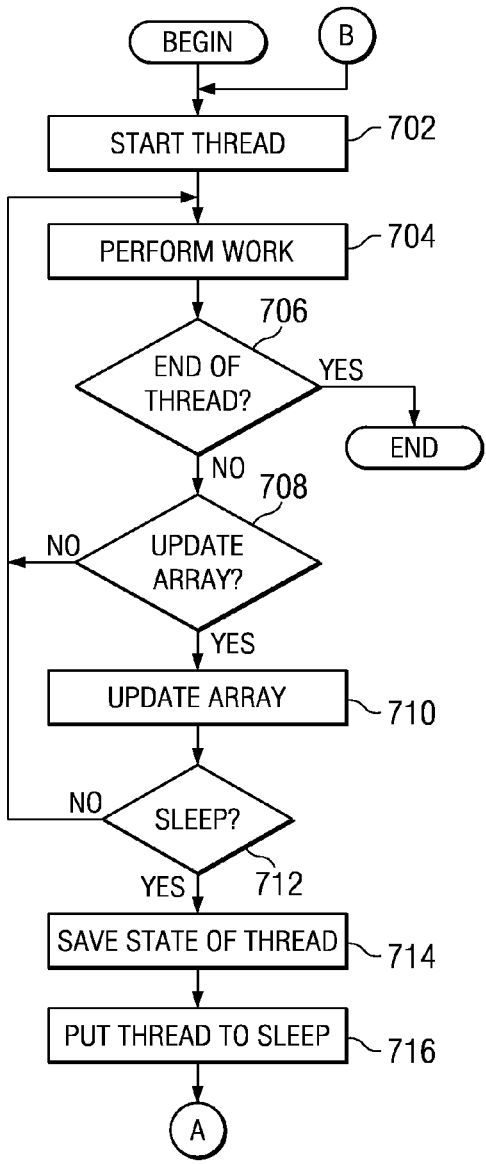
FIGS. 7A and 7B are flowcharts illustrating operation of a wake-and-go mechanism in accordance with the illustrative embodiments.
Figure 7B:
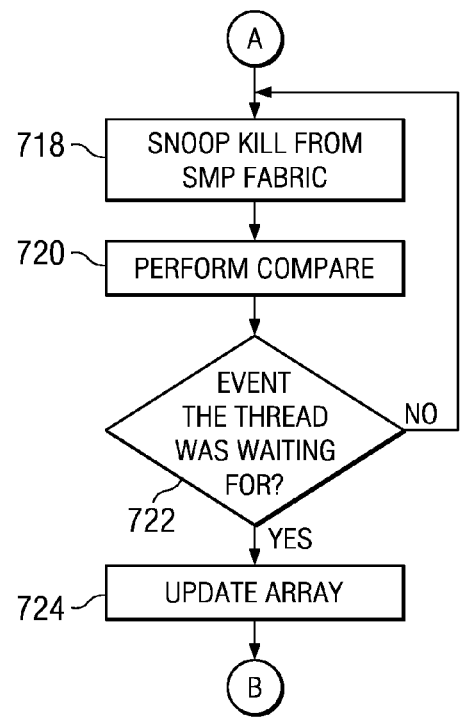

FIGS. 7A and 7B are flowcharts illustrating operation of a wake-and-go mechanism in accordance with the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 7A, operation begins when a thread first initializes or when a thread wakes after sleeping. The operating system starts a thread (block 702) by initializing the thread and placing the thread in the run queue for a processor. The thread then performs work (block 704). The operating system determines whether the thread has completed (block 706). If the thread completes, then operation ends.

If the end of the thread is not reached in block 706, the processor determines whether the next instruction updates the wake-and-go array (block 708). An instruction to update the wake-and-go array may be a specialized processor instruction, an operating system call, a call to a background sleeper thread, or a call to an application programming interface. If the next instruction does not update the wake-and-go array, operation returns to block 704 to perform more work.

If the next instruction does update the wake-and-go array in block 708, the processor updates the array with a target address associated with an event for which the thread is waiting (block 710). The update to the wake-and-go array may be made by the thread through a specialized processor instruction, the operating system, or a background sleeper thread. Next, the operating system then determines whether to put the thread to sleep (block 712). The operating system may keep the thread active in the processor if the processor is underutilized, for instance; however, the operating system may put the thread to sleep if there are other threads waiting to be run on the processor. If the operating system determines that the thread is to remain active, operation returns to block 704 to perform more work, in which case the thread may simply wait for the event.

In one exemplary embodiment, f the operating system determines that the thread is to be put to sleep in block 712, then the operating system or some other software or hardware saves the state of the thread (block 714) and puts the thread to sleep (block 716). Thereafter, operation proceeds to FIG. 7B where the wake-and-go mechanism monitors for an event. In one exemplary embodiment, software may save the state of the thread in thread state storage. The thread is then put to sleep.

In an alternative embodiment, if the operating system determines that the thread is to be put to sleep in block 712, then the operating system or some other software or hardware saves the state of the thread (block 714) in the hardware private array and puts the thread to sleep (block 716). Thereafter, operation proceeds to FIG. 7B where the wake-and-go mechanism monitors for an event.

With reference now to FIG. 7B, the wake-and-go mechanism, which may include a wake-and-go array, such as a content addressable memory, and associated logic, snoops for a kill from the symmetric multiprocessing (SMP) fabric (block 718). A kill occurs when a transaction appears on the SMP fabric that modifies the target address associated with the event for which a thread is waiting. The wake-and-go mechanism then performs a compare (block 720) and determines whether the value being written to the target address represents the event for which the thread is waiting (block 722). If the kill corresponds to the event for which the thread is waiting, then the operating system updates the array (block 724) to remove the target address from the wake-and-go array. Thereafter, operation returns to block 702 in FIG. 7A where the operating system restarts the thread.

In one exemplary embodiment, when the wake-and-go mechanism snoops a kill at a target address, the wake-and-go mechanism may generate an exception. The processor sees the exception and performs a trap, which results in a switch to kernel mode, wherein the operating system may perform some action before returning control to the originating process. In this case, the trap results in other software to reload the thread from the thread state storage and to continue processing of the active threads on the processor in block 702.

In one exemplary embodiment, when the wake-and-go mechanism snoops a kill at a target address, software or hardware reloads the thread from the hardware private array and the processor continues processing the active threads on the processor in block 702.

If the kill does not correspond to the event for which the thread is waiting in block 722, then operation returns to block 718 to snoop a kill from the SMP fabric. In FIG. 7B, the wake-and-go mechanism may be a combination of logic associated with the wake-and-go array, such as a CAM, and software within the operating system, software within a background sleeper thread, or other hardware.

In an alternative embodiment, the wake-and-go mechanism may be a combination of logic associated with the wake-and-go array and software within the thread itself. In such an embodiment, the thread will wake every time there is a kill to the target address. The thread itself may then perform a compare operation to determine whether to perform more work or to go back to sleep. If the thread decides to go back to sleep, it may again save the state of the thread. The over head for waking the thread every time there is a kill to the target address will likely be much less than polling or event handlers.

Prioritization of Threads

Figure 8A:
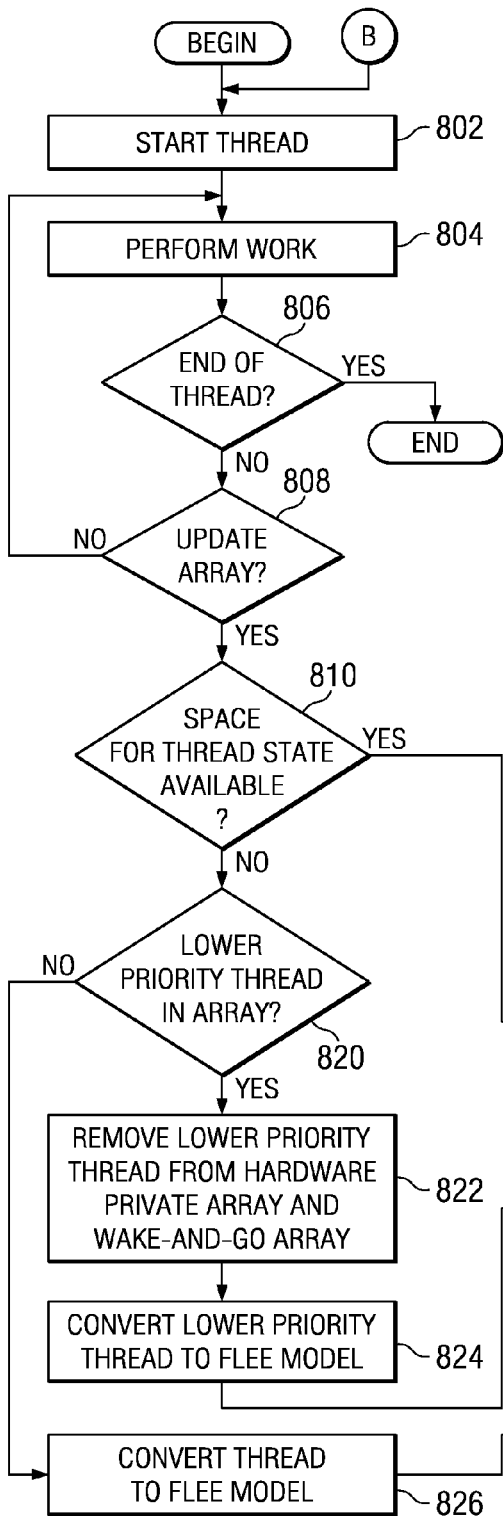
FIGS. 8A and 8B are flowcharts illustrating operation of a wake-and-go mechanism with prioritization of threads in accordance with the illustrative embodiments.
Figure 8B:
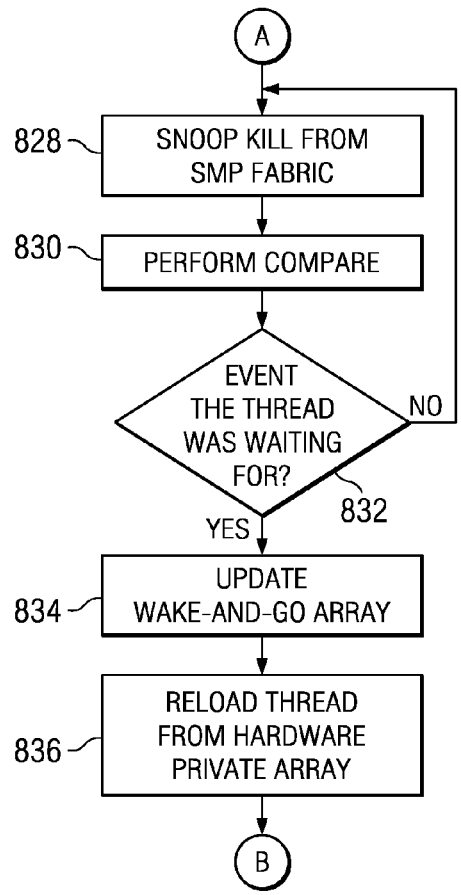

FIGS. 8A and 8B are flowcharts illustrating operation of a wake-and-go mechanism with prioritization of threads in accordance with the illustrative embodiments. Operation begins when a thread first initializes or when a thread wakes after sleeping. The operating system starts a thread (block 802) by initializing the thread and placing the thread in the run queue for a processor. The thread then performs work (block 804). The operating system determines whether the thread has completed (block 806). If the thread completes, then operation ends.

If the end of the thread is not reached in block 806, the processor determines whether the next instruction updates the wake-and-go array (block 808). An instruction to update the wake-and-go array may be a specialized processor instruction, an operating system call, a call to a background sleeper thread, or a call to an application programming interface. If the next instruction does not update the wake-and-go array, operation returns to block 804 to perform more work.

If the next instruction does update the wake-and-go array in block 808, the wake-and-go mechanism determines whether there is sufficient space for the thread state in the hardware private array (block 810). If there is sufficient space available, the wake-and-go mechanism allocates space for the thread state in the hardware private array (block 812). This allocation may simply comprise reserving the requisite space for the thread space, which may be about 1000 bytes, for example. If the hardware private array is reserved portion of system memory, then allocating space may comprise requesting more system memory to be reserved for the hardware private array. Then, the wake-and-go mechanism saves the state of the thread in the hardware private array (block 814), updates the wake-and-go array with the target address and other information, if any (block 816), and puts the thread to sleep (block 818). Thereafter, operation proceeds to FIG. 8B where the wake-and-go mechanism monitors for an event.

If there is insufficient space for the thread state available in the hardware private array in block 810, then the wake-and-go mechanism determines whether there is at least one lower priority thread in the hardware private array or wake-and-go array (block 820). As described above, each thread may have an associated priority parameter that is stored in the hardware private array or wake-and-go array. Alternatively, priority may be determined by other factors, such as staleness. If there is at least one lower priority thread in the hardware private array, the wake-and-go mechanism removes the lower priority thread from the hardware private array and wake-and-go array (block 822) and converts the lower priority thread to a flee model (block 824). Thereafter, operation proceeds to block 814 to save the state of the new thread, update the wake-and-go array, and put the thread to sleep.

If there is not a lower priority thread in the hardware private array in block 820, the wake-and-go mechanism converts the new thread to a flee model (block 826). Thereafter, operation proceeds to block 818 to put the thread to sleep.

With reference now to FIG. 8B, the wake-and-go mechanism, which may include a wake-and-go array, such as a content addressable memory, and associated logic, snoops for a kill from the symmetric multiprocessing (SMP) fabric (block 826). A kill occurs when a transaction appears on the SMP fabric that modifies the target address associated with the event for which a thread is waiting. The wake-and-go mechanism then performs a compare (block 828) and determines whether the value being written to the target address represents the event for which the thread is waiting (block 830). If the kill corresponds to the event for which the thread is waiting, then the operating system updates the wake-and-go array (block 832) to remove the target address from the wake-and-go array. Then, the wake-and-go mechanism reloads the thread from the hardware private array (block 834). Thereafter, operation returns to block 802 in FIG. 8A where the operating system restarts the thread.

In one exemplary embodiment, when the wake-and-go mechanism snoops a kill at a target address, software or hardware reloads the thread from the hardware private array and the processor continues processing the active threads on the processor in block 802.

If the kill does not correspond to the event for which the thread is waiting in block 830, then operation returns to block 826 to snoop a kill from the SMP fabric. In FIG. 8B, the wake-and-go mechanism may be a combination of logic associated with the wake-and-go array, such as a CAM, and software within the operating system, software within a background sleeper thread, or other hardware.

Dynamic Allocation in Hardware Private Array

Figure 9A:
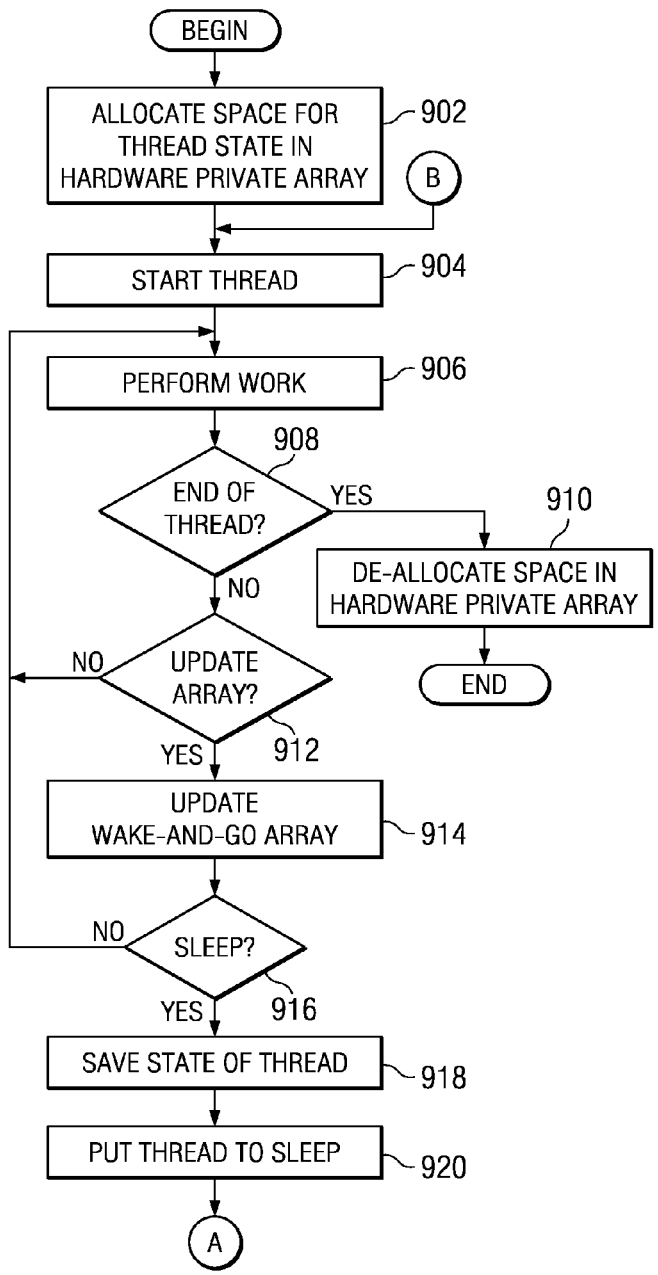
FIGS. 9A and 9B are flowcharts illustrating operation of a wake-and-go mechanism with dynamic allocation in a hardware private array in accordance with the illustrative embodiments.
Figure 9B:
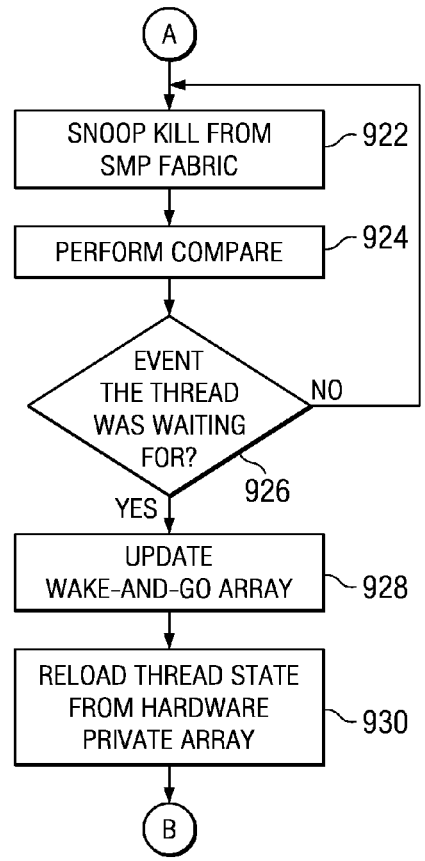

FIGS. 9A and 9B are flowcharts illustrating operation of a wake-and-go mechanism with dynamic allocation in a hardware private array in accordance with the illustrative embodiments. Operation begins when a thread first initializes or when a thread wakes after sleeping. The wake-and-go mechanism allocates space for thread state information in the hardware private array (block 902). The operating system starts a thread (block 904) by initializing the thread and placing the thread in the run queue for a processor. The wake-and-go mechanism may also allocate space in the wake-and-go array. The thread then performs work (block 906). The operating system determines whether the thread has completed (block 908). If the thread completes, then the wake-and-go mechanism de-allocates the space corresponding to the thread state information for the thread (block 910), and operation ends.

If the end of the thread is not reached in block 908, the processor determines whether the next instruction updates the wake-and-go array (block 912). An instruction to update the wake-and-go array may be a specialized processor instruction, an operating system call, a call to a background sleeper thread, or a call to an application programming interface. If the next instruction does not update the wake-and-go array, operation returns to block 906 to perform more work.

If the next instruction does update the wake-and-go array in block 912, the wake-and-go mechanism updates the wake-and-go array with a target address associated with an event for which the thread is waiting (block 914). The update to the wake-and-go array may be made by the thread through a specialized processor instruction, the operating system, or a background sleeper thread. Next, the operating system then determines whether to put the thread to sleep (block 916). The operating system may keep the thread active in the processor if the processor is underutilized, for instance; however, the operating system may put the thread to sleep if there are other threads waiting to be run on the processor. If the operating system determines that the thread is to remain active, operation returns to block 906 to perform more work, in which case the thread may simply wait for the event.

If the operating system determines that the thread is to be put to sleep in block 916, then the operating system or some other software or hardware saves the state of the thread (block 918) in the hardware private array and puts the thread to sleep (block 920). Thereafter, operation proceeds to FIG. 9B where the wake-and-go mechanism monitors for an event.

With reference now to FIG. 9B, the wake-and-go mechanism, which may include a wake-and-go array, such as a content addressable memory, and associated logic, snoops for a kill from the symmetric multiprocessing (SMP) fabric (block 922). A kill occurs when a transaction appears on the SMP fabric that modifies the target address associated with the event for which a thread is waiting. The wake-and-go mechanism then performs a compare (block 924) and determines whether the value being written to the target address represents the event for which the thread is waiting (block 926). If the kill corresponds to the event for which the thread is waiting, then the operating system updates the wake-and-go array (block 928) to remove the target address from the wake-and-go array. The wake-and-go mechanism then reloads the thread state from the hardware private array (block 930). Thereafter, operation returns to block 904 in FIG. 9A where the operating system restarts the thread.

If the kill does not correspond to the event for which the thread is waiting in block 926, then operation returns to block 922 to snoop a kill from the SMP fabric. In FIG. 9B, the wake-and-go mechanism may be a combination of logic associated with the wake-and-go array, such as a CAM, and software within the operating system, software within a background sleeper thread, or other hardware.

Hardware Wake-and-Go Mechanism

Figure 10:
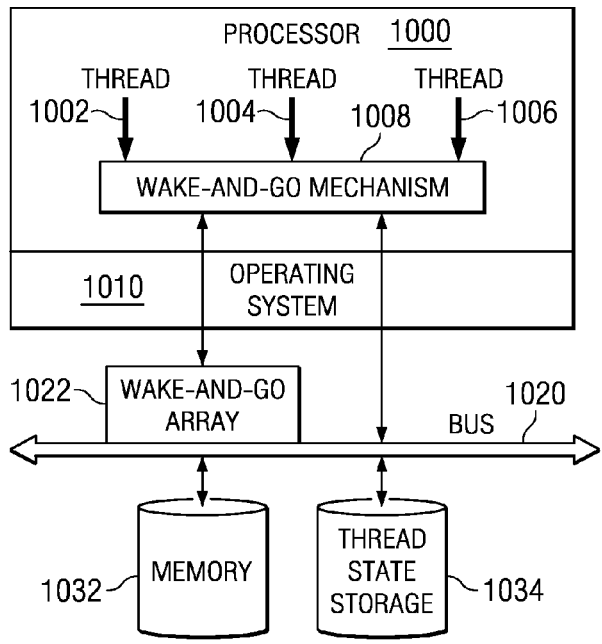
FIG. 10 is a block diagram of a hardware wake-and-go mechanism in a data processing system in accordance with an illustrative embodiment.

FIG. 10 is a block diagram of a hardware wake-and-go mechanism in a data processing system in accordance with an illustrative embodiment. Threads 1002, 1004, 1006 run on processor 1000. Threads 1002, 1004, 1006 make calls to operating system 1010 to communicate with each other, memory 1032 via bus 1020, or other devices within the data processing system. While the data processing system in FIG. 10 shows one processor, more processors may be present depending upon the implementation where each processor has a separate wake-and-go array or one wake-and-go array stores target addresses for threads for multiple processors.

Wake-and-go mechanism 1008 is a hardware implementation within processor 1000. In an alternative embodiment, hardware wake-and-go mechanism 1008 may be logic associated with wake-and-go array 1022 attached to bus 1020 or a separate, dedicated wake-and-go engine as described in further detail below.

In accordance with the illustrative embodiment, hardware wake-and-go mechanism 1008 is provided within processor 1000 and wake-and-go array 1022 is attached to the SMP fabric. The SMP fabric is a communication medium through which processors communicate. The SMP fabric may comprise a single SMP bus or a system of busses, for example. In the depicted example, the SMP fabric comprises bus 1020. A thread, such as thread 1002, for example, may include instructions that indicate that the thread is waiting for an event. The event may be an asynchronous event, which is an event that happens independently in time with respect to execution of the thread in the data processing system. For example, an asynchronous event may be a temperature value reaching a particular threshold, a stock price falling below a given threshold, or the like. Alternatively, the event may be related in some way to execution of the thread. For example, the event may be obtaining a lock for exclusive access to a database record or the like.

Processor 1000 may pre-fetch instructions from storage (not shown) to memory 1032. These instructions may comprise a get-and-compare sequence, for example. Wake-and-go mechanism 1008 within processor 1000 may examine the instruction stream as it is being pre-fetched and recognize the get-and-compare sequence as a programming idiom that indicates that thread 1002 is waiting for data at a particular target address. A programming idiom is a sequence of programming instructions that occurs often and is recognizable as a sequence of instructions. In this example, an instruction sequence that includes load (LD), compare (CMP), and branch (BC) commands represents a programming idiom that indicates that the thread is waiting for data to be written to a particular target address. In this case, wake-and-go mechanism 1008 recognizes such a programming idiom and may store the target address in wake-and-go array 1022, where the event the thread is waiting for is associated with the target address. After updating wake-and-go array 1022 with the target address, wake-and-go mechanism 1008 may put thread 1002 to sleep.

Wake-and-go mechanism 1008 also may save the state of thread 1002 in thread state storage 1034, which may be allocated from memory 1032 or may be a hardware private array within the processor (not shown) or pervasive logic (not shown). When a thread is put to sleep, i.e., removed from the run queue of a processor, the operating system must store sufficient information on its operating state such that when the thread is again scheduled to run on the processor, the thread can resume operation from an identical position. This state information is sometime referred to as the thread's "context." The state information may include, for example, address space, stack space, virtual address space, program counter, instruction register, program status word, and the like.

If a transaction appears on bus 1020 that modifies a value at an address in wake-and-go array 1022, then wake-and-go mechanism 1008 may wake thread 1002. Wake-and-go mechanism 1008 may wake thread 1002 by recovering the state of thread 1002 from thread state storage 1034. Thread 1002 may then determine whether the transaction corresponds to the event for which the thread was waiting by performing a get-and-compare operation, for instance. If the transaction is the event for which the thread was waiting, then thread 1002 will perform work. However, if the transaction is not the event, then thread 1002 will go back to sleep. Thus, thread 1002 only performs a get-and-compare operation if there is a transaction that modifies the target address.

Alternatively, operating system 1010 or a background sleeper thread, such as thread 1004, may determine whether the transaction is the event for which the thread was waiting. Before being put to sleep, thread 1002 may update a data structure in the operating system or background sleeper thread with a value for which it is waiting.

In one exemplary embodiment, wake-and-go array 1022 may be a content addressable memory (CAM). A CAM is a special type of computer memory often used in very high speed searching applications. A CAM is also known as associative memory, associative storage, or associative array, although the last term is more often used for a programming data structure. Unlike a random access memory (RAM) in which the user supplies a memory address and the RAM returns the data value stored at that address, a CAM is designed such that the user supplies a data value and the CAM searches its entire memory to see if that data value is stored within the CAM. If the data value is found, the CAM returns a list of one or more storage addresses where the data value was found. In some architectures, a CAM may return the data value or other associated pieces of data. Thus, a CAM may be considered the hardware embodiment of what in software terms would be called an associative array.

Thus, in an exemplary embodiment, wake-and-go array 1022 may comprise a CAM and associated logic that will be triggered if a transaction appears on bus 1020 that modifies an address stored in the CAM. A transaction that modifies a value at a target address may be referred to as a "kill"; thus, wake-and-go array 1022 may be said to be "snooping kills." In this exemplary embodiment, the data values stored in the CAM are the target addresses at which threads are waiting for something to be written. The address at which a data value, a given target address, is stored is referred to herein as the storage address. Each storage address may refer to a thread that is asleep and waiting for an event. Wake-and-go array 1022 may store multiple instances of the same target address, each instance being associated with a different thread waiting for an event at that target address. Thus, when wake-and-go array 1022 snoops a kill at a given target address, wake-and-go array 1022 may return one or more storage addresses that are associated with one or more sleeping threads.

Figure 11A:
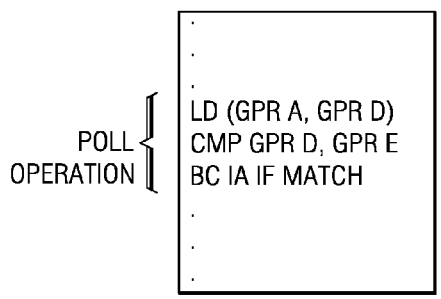
FIGS. 11A and 11B illustrate a series of instructions that are a programming idiom for wake-and-go in accordance with an illustrative embodiment.
Figure 11B:
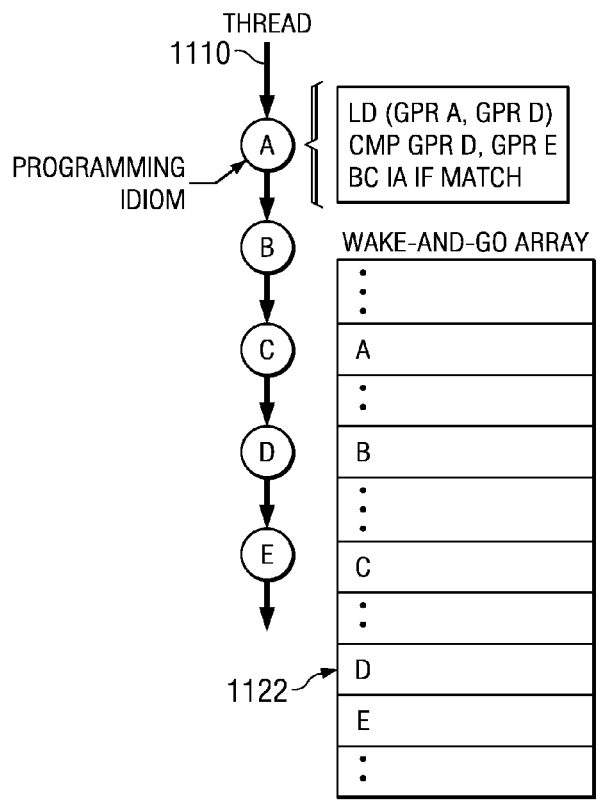

FIGS. 11A and 11B illustrate a series of instructions that are a programming idiom for wake-and-go in accordance with an illustrative embodiment. With reference to FIG. 11A, the instruction sequence includes load (LD), compare (CMP), and branch (BC) commands that represent a programming idiom that indicate that the thread is waiting for data to be written to a particular target address. The load command (LD) loads a data value to general purpose register GPR D from the address in general purpose register GPR A. The compare command (CMP) then compares the value loaded into general purpose register GPR D with a value already stored in general purpose register GPR E. If the compare command results in a match, then the branch command (BC) branches to instruction address IA.

The wake-and-go mechanism may recognize the poll operation idiom. When the wake-and-go mechanism recognizes such a programming idiom, the wake-and-go mechanism may store the target address from GPR A in the wake-and-go array, where the event the thread is waiting for is associated with the target address. After updating the wake-and-go array with the target address, the wake-and-go mechanism may put the thread to sleep.

With reference now to FIG. 11B, thread 1110 may have a plurality of programming idioms. The wake-and-go mechanism may look ahead within thread 1110 and load wake-and-go array 1122 with the target address and other information, if any. Therefore, when thread 1110 reaches each programming idiom while executing, the wake-and-go array 1122 will already be loaded with the target address, and thread 1110 may simply go to sleep until wake-and-go array snoops the target address on the SMP fabric.

The wake-and-go mechanism may perform a look-ahead polling operation for each programming idiom. In the depicted example, idioms A, B, C, and D fail. In those cases, the wake-and-go mechanism may update wake-and-go array 1122. In this example, idiom E passes; therefore, there is no need to update wake-and-go array 1122, because there is no need to put the thread to sleep when idiom E executes.

In one exemplary embodiment, the wake-and-go mechanism may update wake-and-go array 1122 only if all of the look-ahead polling operations fail. If at least one look-ahead polling operation passes, then the wake-and-go mechanism may consider each idiom as it occurs during execution.

Figure 12B:
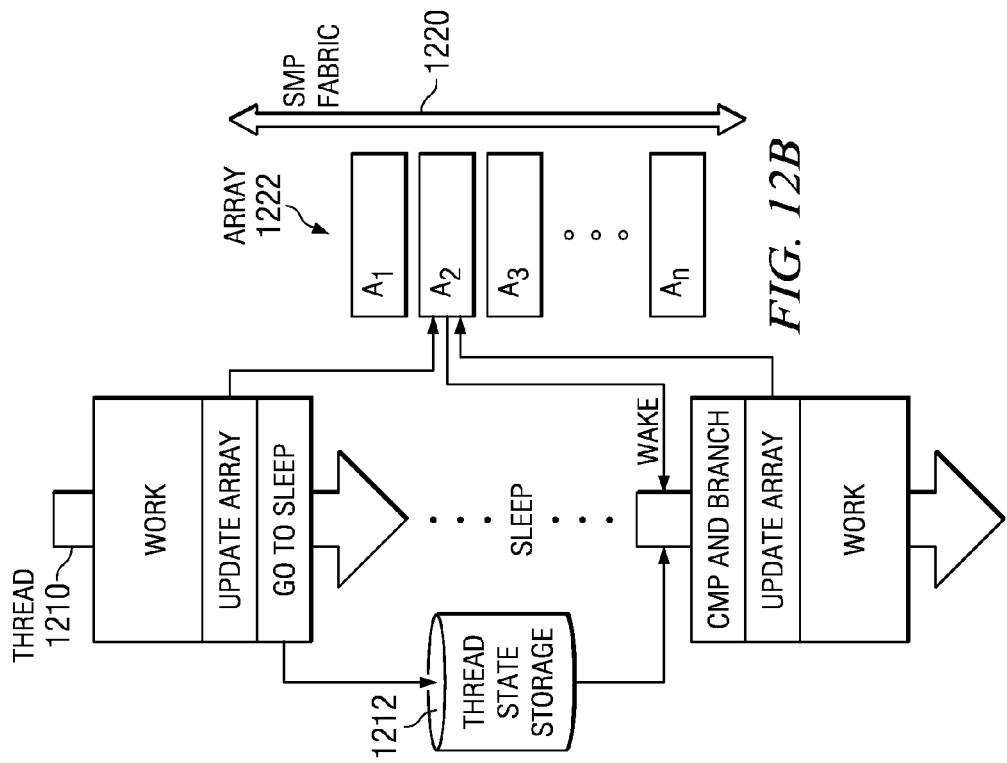
FIGS. 12A and 12B are block diagrams illustrating operation of a hardware wake-and-go mechanism in accordance with an illustrative embodiment.
Figure 12A:
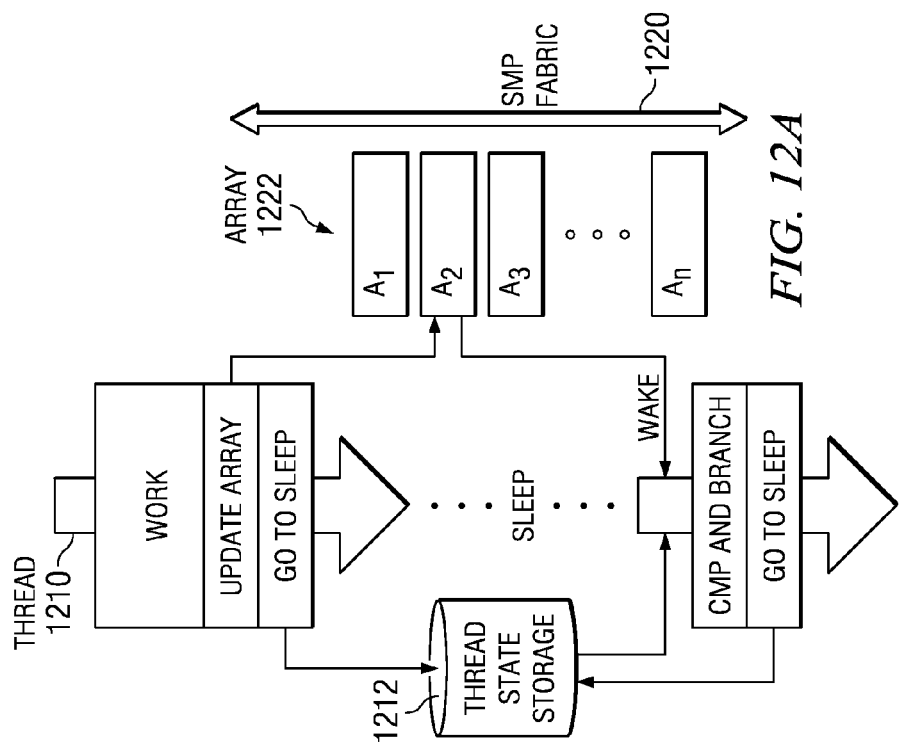

FIGS. 12A and 12B are block diagrams illustrating operation of a hardware wake-and-go mechanism in accordance with an illustrative embodiment. With particular reference to FIG. 12A, thread 1210 runs in a processor (not shown) and performs some work. Thread 1210 executes a series of instructions that are a programming idiom for wake-and-go. The wake-and-go mechanism may recognize the poll operation idiom. When the wake-and-go mechanism recognizes such a programming idiom, the wake-and-go mechanism may store the target address $A_2$ in wake-and-go array 1222, where the event the thread is waiting for is associated with the target address, and stores thread state information for thread 1210 in thread state storage 1212. After updating wake-and-go array 1222 with the target address $A_2$, the wake-and-go mechanism may put the thread 1210 to sleep.

When a transaction appears on SMP fabric 1220 with an address that matches the target address $A_2$, array 1222 returns the storage address that is associated with thread 1210. The wake-and-go mechanism then wakes thread 1210 by retrieving the thread state information from thread state storage 1212 and placing the thread in the run queue for the processor. Thread 1210 may then perform a compare-and-branch operation to determine whether the value written to the target address represents the event for which thread 1210 is waiting. In the depicted example, the value written to the target address does not represent the event for which thread 1210 is waiting; therefore, thread 1210 goes back to sleep.

Turning to FIG. 12B, thread 1210 runs in a processor (not shown) and performs some work. Thread 1210 executes a series of instructions that are a programming idiom for wake-and-go. The wake-and-go mechanism may recognize the poll operation idiom. When the wake-and-go mechanism recognizes such a programming idiom, the wake-and-go mechanism may store the target address $A_2$ in wake-and-go array 1222, where the event the thread is waiting for is associated with the target address, and stores thread state information for thread 1210 in thread state storage 1212. After updating wake-and-go array 1222 with the target address $A_2$, the wake-and-go mechanism may put the thread 1210 to sleep.

When a transaction appears on SMP fabric 1220 with an address that matches the target address $A_2$, array 1222 returns the storage address that is associated with thread 1210. The wake-and-go mechanism then wakes thread 1210 by retrieving the thread state information from thread state storage 1212 and placing the thread in the run queue for the processor. Thread 1210 may then perform a compare-and-branch operation to determine whether the value written to the target address represents the event for which thread 1210 is waiting. In the depicted example, the value written to the target address does represent the event for which thread 1210 is waiting; therefore, thread 1210 updates the array to remove the target address from array 1222, and performs more work.

Figure 13A:
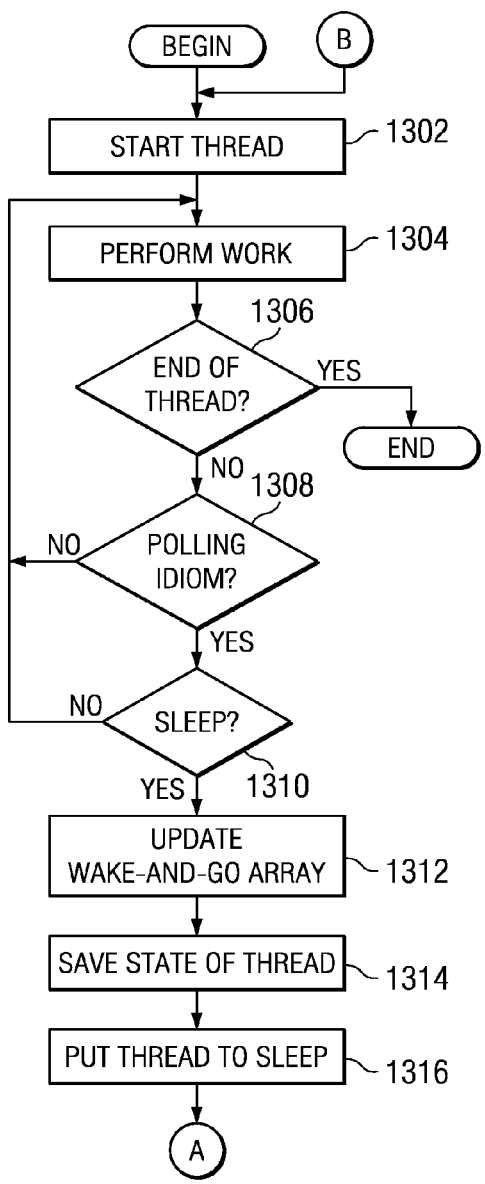
FIGS. 13A and 13B are flowcharts illustrating operation of a hardware wake-and-go mechanism in accordance with the illustrative embodiments.
Figure 13B:
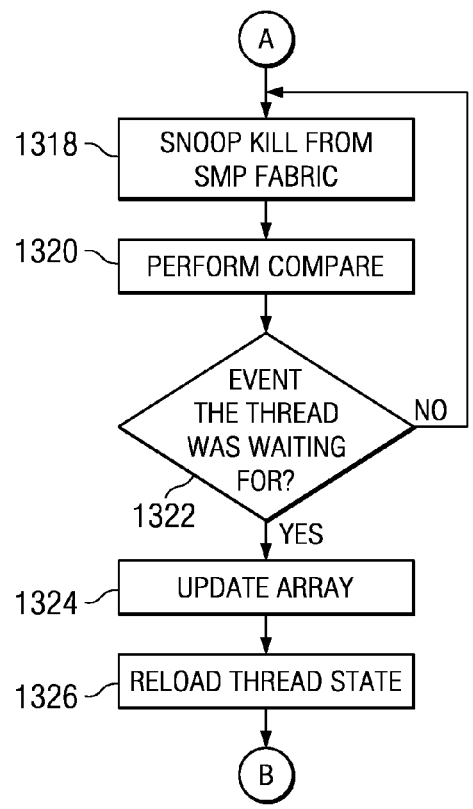

FIGS. 13A and 13B are flowcharts illustrating operation of a hardware wake-and-go mechanism in accordance with the illustrative embodiments. Operation begins when a thread first initializes or when a thread wakes after sleeping. The operating system starts a thread (block 1302) by initializing the thread and placing the thread in the run queue for a processor. The thread then performs work (block 1304). The operating system determines whether the thread has completed (block 1306). If the thread completes, then operation ends.

If the end of the thread is not reached in block 1306, the processor determines whether the next instructions comprise a wake-and-go idiom, such as a polling operation, for example (block 1308). A wake-and-go idiom may comprise a series of instructions, such as a load, compare, and branch sequence, for example. If the next instructions doe not comprise a wake-and-go idiom, the wake-and-go mechanism returns to block 1304 to perform more work.

If the next instructions do comprise a wake-and-go idiom in block 1308, the wake-and-go mechanism determines whether to put the thread to sleep (block 1310). The wake-and-go mechanism may keep the thread active in the processor if the processor is underutilized, for instance; however, the wake-and-go mechanism may put the thread to sleep if there are other threads waiting to be run on the processor. If the wake-and-go mechanism determines that the thread is to remain active, operation returns to block 1304 to perform more work, in which case the thread may simply wait for the event.

If the wake-and-go mechanism determines that the thread is to be put to sleep in block 1310, then the wake-and-go mechanism updates the array with a target address associated with an event for which the thread is waiting (block 1312). The update to the wake-and-go array may be made by the thread through a specialized processor instruction, the operating system, or a background sleeper thread. Next, the wake-and-go mechanism then saves the state of the thread (block 1314) and puts the thread to sleep (block 1316). Thereafter, operation proceeds to FIG. 13B where the wake-and-go mechanism monitors for an event.

With reference now to FIG. 13B, the wake-and-go mechanism, which may include a wake-and-go array, such as a content addressable memory, and associated logic, snoops for a kill from the symmetric multiprocessing (SMP) fabric (block 1318). A kill occurs when a transaction appears on the SMP fabric that modifies the target address associated with the event for which a thread is waiting. The wake-and-go mechanism, the operating system, the thread, or other software then performs a compare (block 1320) and determines whether the value being written to the target address represents the event for which the thread is waiting (block 1322). If the kill corresponds to the event for which the thread is waiting, then the wake-and-go mechanism updates the array (block 1324) to remove the target address from the wake-and-go array. Thereafter, operation returns to block 1302 in FIG. 13A where the operating system restarts the thread.

If the kill does not correspond to the event for which the thread is waiting in block 1322, then operation returns to block 1318 to snoop a kill from the SMP fabric. In FIG. 13B, the wake-and-go mechanism may be a combination of hardware within the processor, logic associated with the wake-and-go array, which may be a CAM as described above, and software within the operating system, software within a background sleeper thread. In other embodiments, the wake-and-go mechanism may be other software or hardware, such as a dedicated wake-and-go engine, as described in further detail below.

Look-Ahead Polling

Figure 14B:
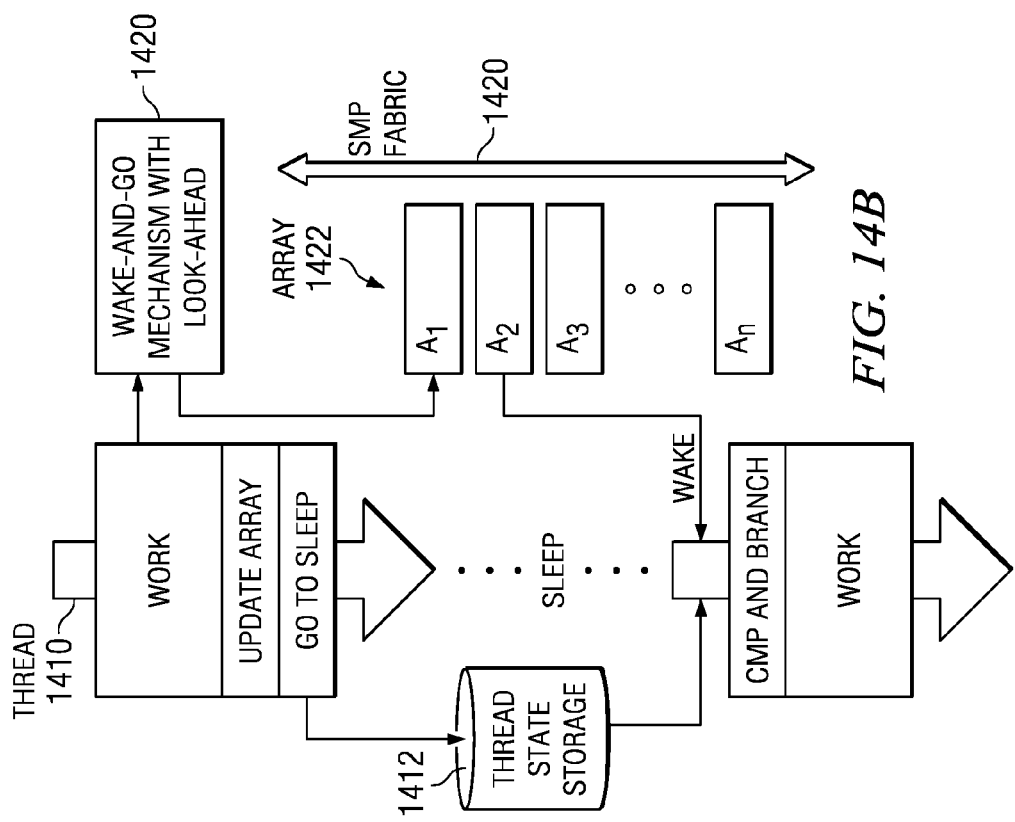
FIGS. 14A and 14B are block diagrams illustrating operation of a wake-and-go engine with look-ahead in accordance with an illustrative embodiment.
Figure 14A:
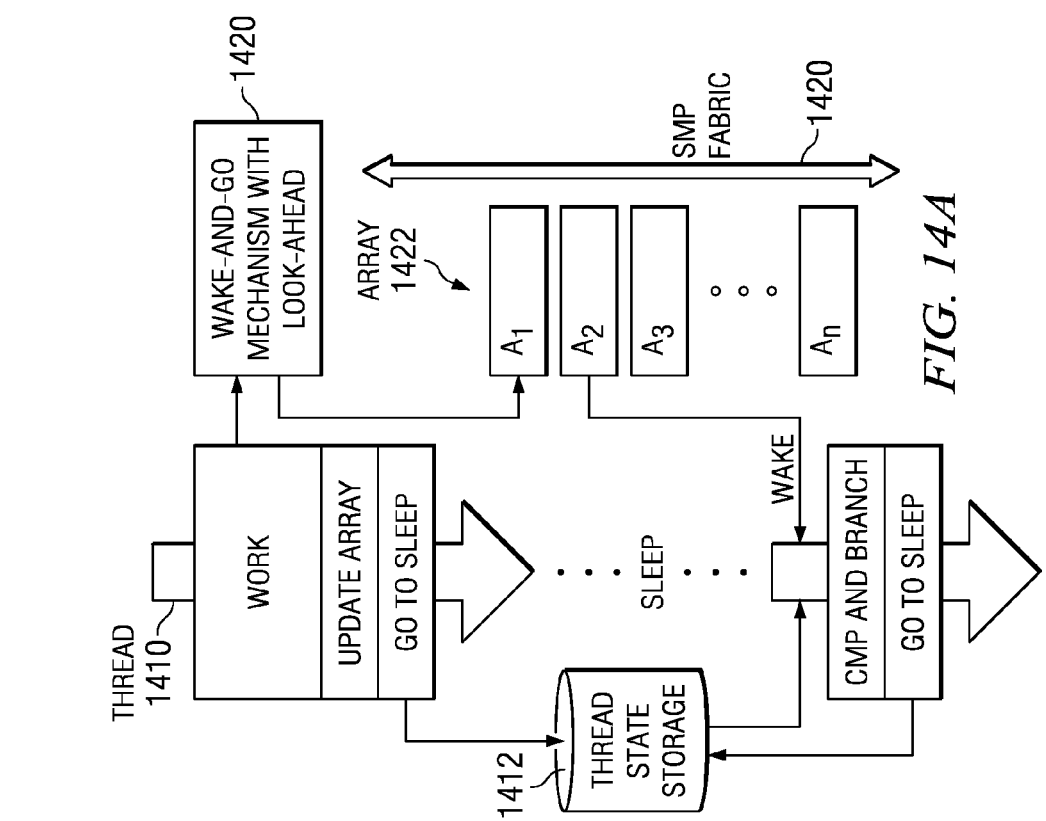

FIGS. 14A and 14B are block diagrams illustrating operation of a wake-and-go engine with look-ahead in accordance with an illustrative embodiment. With particular reference to FIG. 14A, thread 1410 runs in a processor (not shown) and performs some work. Thread 1410 executes a series of instructions that are a programming idiom for wake-and-go. The wake-and-go mechanism may recognize the poll operation idiom. When the wake-and-go mechanism recognizes such a programming idiom, the wake-and-go mechanism may store the target address $A_2$ in wake-and-go array 1422, where the event the thread is waiting for is associated with the target address, and stores thread state information for thread 1410 in thread state storage 1412. After updating wake-and-go array 1422 with the target address $A_2$, the wake-and-go mechanism may put the thread 1410 to sleep.

When a transaction appears on SMP fabric 1420 with an address that matches the target address $A_2$, array 1422 returns the storage address that is associated with thread 1410. The wake-and-go mechanism then wakes thread 1410 by retrieving the thread state information from thread state storage 1412 and placing the thread in the run queue for the processor. Thread 1410 may then perform a compare-and-branch operation to determine whether the value written to the target address represents the event for which thread 1410 is waiting. In the depicted example, the value written to the target address does not represent the event for which thread 1410 is waiting; therefore, thread 1410 goes back to sleep.

Turning to FIG. 14B, thread 1410 runs in a processor (not shown) and performs some work. Thread 1410 executes a series of instructions that are a programming idiom for wake-and-go. The wake-and-go mechanism may recognize the poll operation idiom. When the wake-and-go mechanism recognizes such a programming idiom, the wake-and-go mechanism may store the target address $A_2$ in wake-and-go array 1422, where the event the thread is waiting for is associated with the target address, and stores thread state information for thread 1410 in thread state storage 1412. After updating wake-and-go array 1422 with the target address $A_2$, the wake-and-go mechanism may put the thread 1410 to sleep.

When a transaction appears on SMP fabric 1420 with an address that matches the target address $A_2$, array 1422 returns the storage address that is associated with thread 1410. The wake-and-go mechanism then wakes thread 1410 by retrieving the thread state information from thread state storage 1412 and placing the thread in the run queue for the processor. Thread 1410 may then perform a compare-and-branch operation to determine whether the value written to the target address represents the event for which thread 1410 is waiting. In the depicted example, the value written to the target address does represent the event for which thread 1410 is waiting; therefore, thread 1410 updates the array to remove the target address from array 1422, and performs more work.

Figure 15:
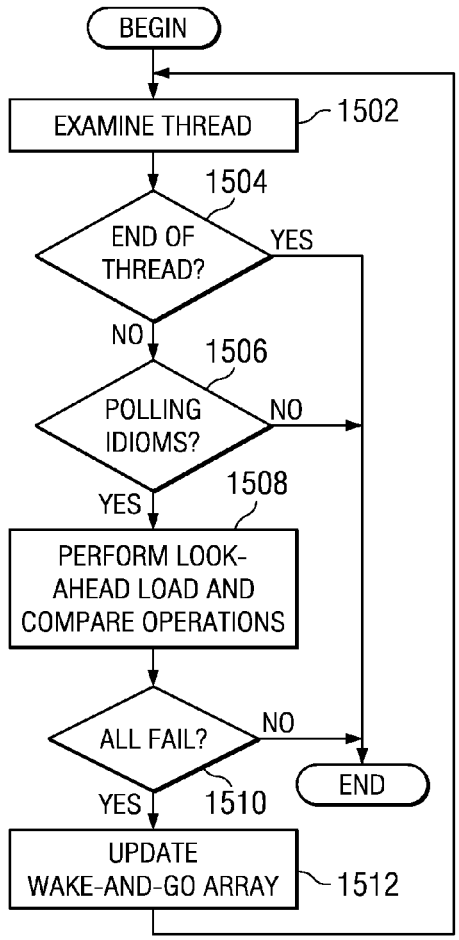
FIG. 15 is a flowchart illustrating a look-ahead polling operation of a wake-and-go look-ahead engine in accordance with an illustrative embodiment.

FIG. 15 is a flowchart illustrating a look-ahead polling operation of a wake-and-go look-ahead engine in accordance with an illustrative embodiment. Operation begins, and the wake-and-go look-ahead engine examines the thread for programming idioms (block 1502). Then, the wake-and-go look-ahead engine determines whether it has reached the end of the thread (block 1504). If the wake-and-go look-ahead engine has reached the end of the thread, operation ends.

If the wake-and-go look-ahead engine has not reached the end of the thread in block 1504, the wake-and-go look-ahead engine determines whether the thread comprises at least one wake-and-go programming idiom that indicates that the thread is waiting for a data value to be written to a particular target address (block 1506). If the thread does not comprise a wake-and-go programming idiom, operation ends.

If the thread does comprise at least one wake-and-go programming idiom in block 1506, then the wake-and-go look-ahead engine performs load and compare operations for the at least one wake-and-go programming idiom (block 1508). Thereafter, the wake-and-go look-ahead engine determines whether all of the load and compare operations fail (block 1510). If all of the look-ahead polling operations fail, then the wake-and-go look-ahead engine updates the wake-and-go array for the at least one programming idiom (block 1512), and operation ends. If at least one look-ahead polling operation succeeds, then operation ends without updating the wake-and-go array. In an alternative embodiment, the look-ahead engine may set up the wake-and-go array without performing look-ahead polling.

Speculative Execution

Figure 16:
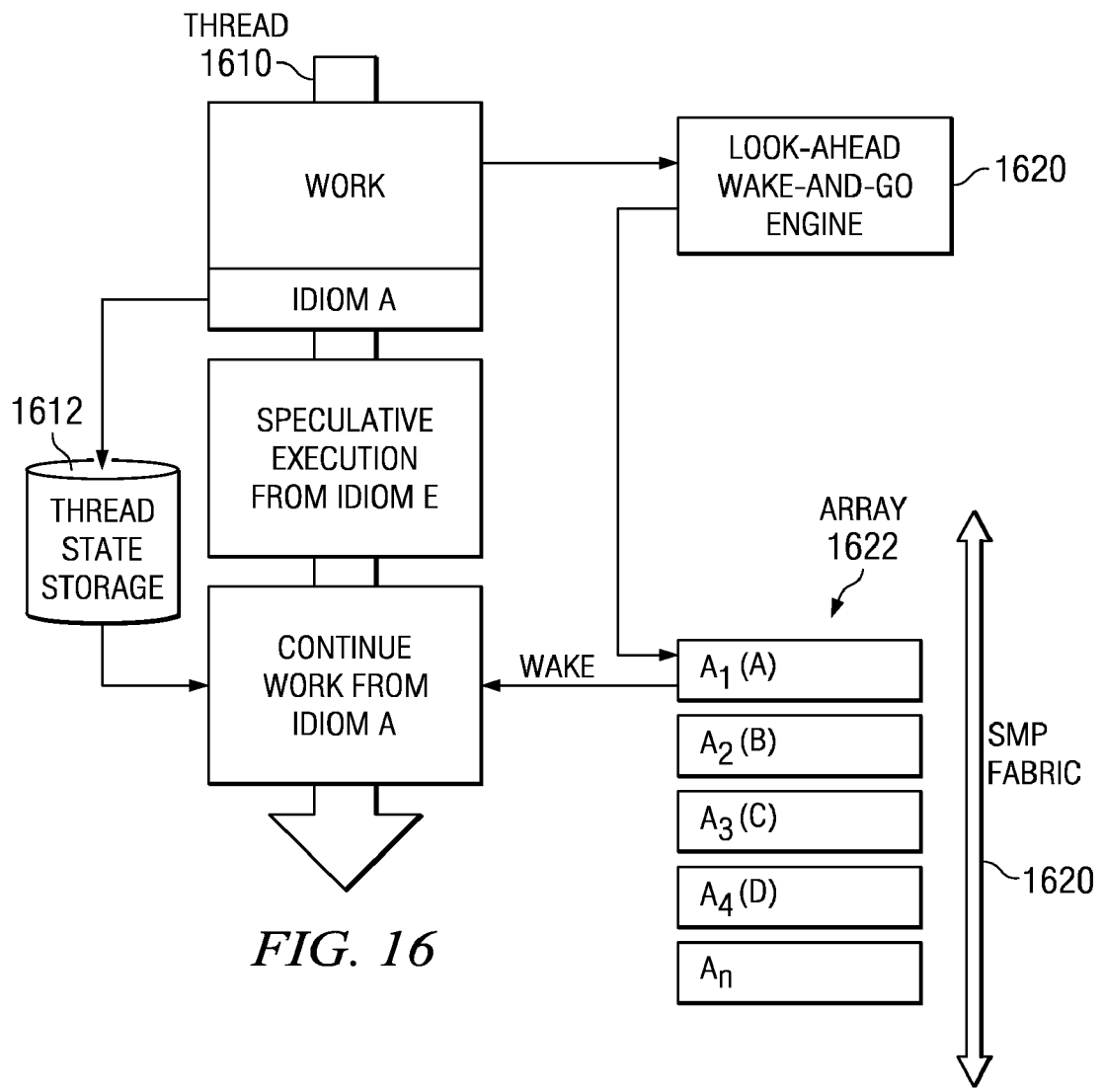
FIG. 16 is a block diagram illustrating operation of a wake-and-go mechanism with speculative execution in accordance with an illustrative embodiment.

FIG. 16 is a block diagram illustrating operation of a wake-and-go mechanism with speculative execution in accordance with an illustrative embodiment. Thread 1610 runs in a processor (not shown) and performs some work. Thread 1610 also includes a series of instructions that are a programming idiom for wake-and-go (idiom A), along with idioms B, C, D, and E from FIG. 11B.

Look-ahead wake-and-go engine 1620 analyzes the instructions in thread 410 ahead of execution. Look-ahead wake-and-go engine 1620 may recognize the poll operation idioms and perform look-ahead polling operations for each idiom. If the look-ahead polling operation fails, the look-ahead wake-and-go engine 1620 populates wake-and-go array 1622 with the target address. In the depicted example from FIG. 11B, idioms A-D fail; therefore, look-ahead wake-and-go engine 1620 populates wake-and-go array 1622 with addresses $A_1$-$A_4$, which are the target addresses for idioms A-D.

If a look-ahead polling operation succeeds, look-ahead wake-and-go engine 1620 may record an instruction address for the corresponding idiom so that the wake-and-go mechanism may have thread 1610 perform speculative execution at a time when thread 1610 is waiting for an event. During execution, when the wake-and-go mechanism recognizes a programming idiom, the wake-and-go mechanism may store the thread state in thread state storage 1612. Instead of putting thread 1610 to sleep, the wake-and-go mechanism may perform speculative execution.

When a transaction appears on SMP fabric 1620 with an address that matches the target address $A_1$, array 1622 returns the storage address that is associated with thread 1610 to the wake-and-go mechanism. The wake-and-go mechanism then returns thread 1610 to the state at which idiom A was encountered by retrieving the thread state information from thread state storage 1612. Thread 1610 may then continue work from the point of idiom A.

Figure 17:
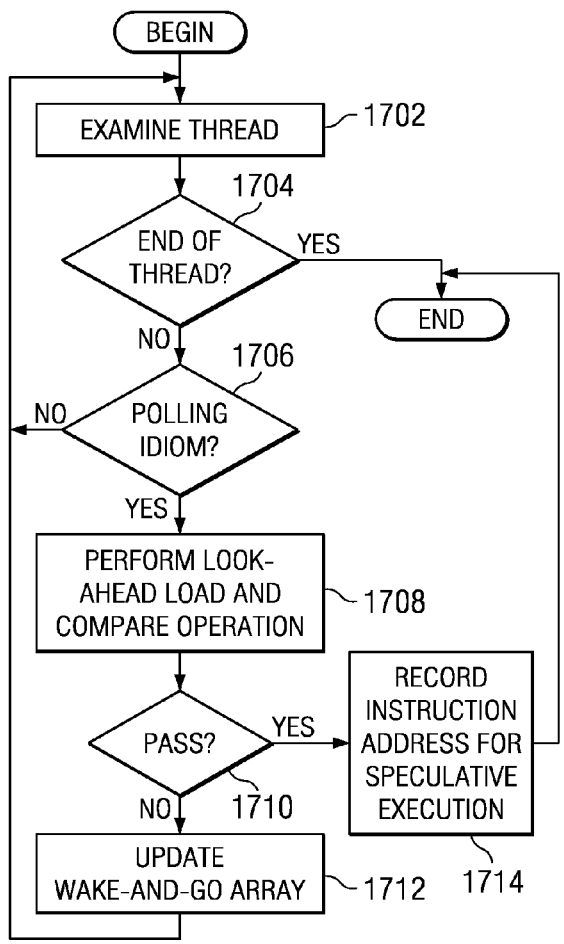
FIG. 17 is a flowchart illustrating operation of a look-ahead wake-and-go mechanism with speculative execution in accordance with an illustrative embodiment.

FIG. 17 is a flowchart illustrating operation of a look-ahead wake-and-go mechanism with speculative execution in accordance with an illustrative embodiment. Operation begins, and the wake-and-go look-ahead engine examines the thread for programming idioms (block 1702). Then, the wake-and-go look-ahead engine determines whether it has reached the end of the thread (block 1704). If the wake-and-go look-ahead engine has reached the end of the thread, operation ends.

If the wake-and-go look-ahead engine has not reached the end of the thread in block 1704, the wake-and-go look-ahead engine determines whether next sequence of instructions comprises a wake-and-go programming idiom that indicates that the thread is waiting for a data value to be written to a particular target address (block 1706). If the next sequence of instructions does not comprise a wake-and-go programming idiom, operation returns to block 502 to examine the next sequence of instructions in the thread. A wake-and-go programming idiom may comprise a polling idiom, as described with reference to FIG. 11A.

If the next sequence of instructions does comprise a wake-and-go programming idiom in block 1706, then the wake-and-go look-ahead engine performs load and compare operations for the wake-and-go programming idiom (block 1708). Thereafter, the wake-and-go look-ahead engine determines whether the load and compare operation passes (block 1710). If the look-ahead polling operation fails, then the wake-and-go look-ahead engine updates the wake-and-go array for the programming idiom (block 1712), and operation returns to block 1702 to examine the next sequence of instructions in the thread. If the look-ahead polling operation passes, then the look-ahead wake-and-go engine records an instruction address for the successful programming idiom to be used for speculative execution later (block 1714). Thereafter, operation ends.

Figure 18A:
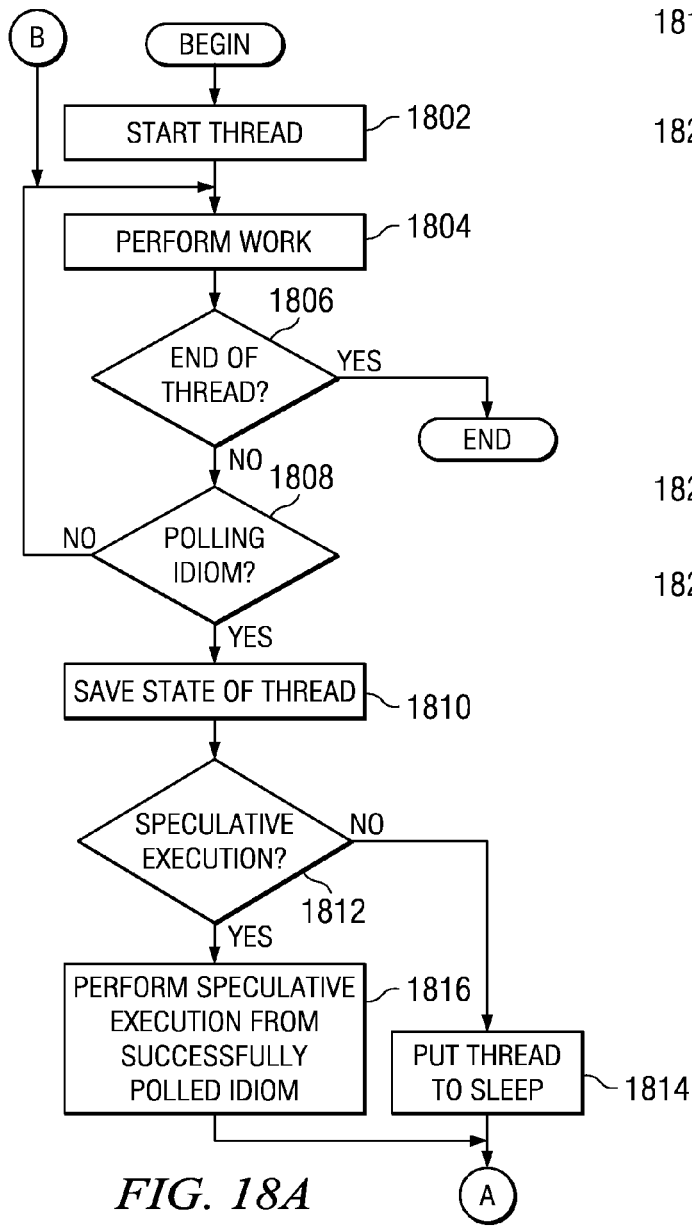
FIGS. 18A and 18B are flowcharts illustrating operation of a wake-and-go mechanism with speculative execution during execution of a thread in accordance with an illustrative embodiment.
Figure 18B:
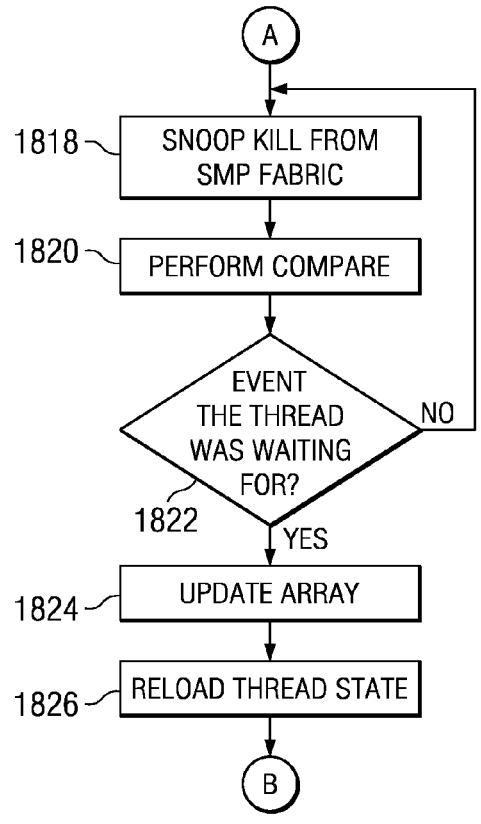

FIGS. 18A and 18B are flowcharts illustrating operation of a wake-and-go mechanism with speculative execution during execution of a thread in accordance with an illustrative embodiment. With reference now to FIG. 18A, operation begins when a thread first initializes or when a thread wakes after sleeping. The operating system starts a thread (block 1802) by initializing the thread and placing the thread in the run queue for a processor. The thread then performs work (block 1804). The operating system determines whether the thread has completed (block 1806). If the thread completes, then operation ends.

If the end of the thread is not reached in block 1806, the processor determines whether the next instructions comprise a wake-and-go idiom, such as a polling operation, for example (block 1808). A wake-and-go idiom may comprise a series of instructions, such as a load, compare, and branch sequence, for example. If the next instructions do not comprise a wake-and-go idiom, the wake-and-go mechanism returns to block 1804 to perform more work.

If the next instructions do comprise a wake-and-go idiom in block 1808, the wake-and-go mechanism saves the state of the thread (block 1810). Then, the wake-and-go mechanism determines whether to perform speculative execution (block 1812). The wake-and-go mechanism may make this determination by determining whether the look-ahead wake-and-go engine previously performed a successful look-ahead polling operation and recorded an instruction address.

If the wake-and-go mechanism determines that the processor cannot perform speculative execution, the wake-and-go mechanism puts the thread to sleep. Thereafter, operation proceeds to FIG. 18B where the wake-and-go mechanism monitors for an event.

If the wake-and-go mechanism determines that the processor can perform speculative execution from a successful polling idiom, the wake-and-go mechanism begins performing speculative execution from the successfully polled idiom (block 616). Thereafter, operation proceeds to FIG. 18B where the wake-and-go mechanism monitors for an event.

With reference now to FIG. 18B, the wake-and-go mechanism, which may include a wake-and-go array, such as a content addressable memory, and associated logic, snoops for a kill from the symmetric multiprocessing (SMP) fabric (block 1818). A kill occurs when a transaction appears on the SMP fabric that modifies the target address associated with the event for which a thread is waiting. The wake-and-go mechanism, the operating system, the thread, or other software then performs a compare (block 1820) and determines whether the value being written to the target address represents the event for which the thread is waiting (block 1822). If the kill corresponds to the event for which the thread is waiting, then the wake-and-go mechanism updates the array (block 1824) to remove the target address from the wake-and-go array. Thereafter, operation returns to block 1804 in FIG. 18A where the processor performs more work.

If the kill does not correspond to the event for which the thread is waiting in block 1822, then operation returns to block 1818 to snoop a kill from the SMP fabric. In FIG. 18B, the wake-and-go mechanism may be a combination of hardware within the processor, logic associated with the wake-and-go array, such as a CAM, and software within the operating system, software within a background sleeper thread, or other hardware.

Data Monitoring

Returning to FIG. 10, the instructions may comprise a get-and-compare sequence, for example. Wake-and-go mechanism 1008 within processor 1000 may recognize the get-and-compare sequence as a programming idiom that indicates that thread 1002 is waiting for data at a particular target address. When wake-and-go mechanism 1008 recognizes such a programming idiom, wake-and-go mechanism 1008 may store the target address, the data thread 1002 is waiting for, and a comparison type in wake-and-go array 1022, where the event the thread is waiting for is associated with the target address. After updating wake-and-go array 1022 with the target address, wake-and-go mechanism 1008 may put thread 1002 to sleep.

The get-and-compare sequence may load a data value from a target address, perform a compare operation based on an expected data value, and branch if the compare operation matches. Thus, the get-and-compare sequence had three basic elements: an address, an expected data value, and a comparison type. The comparison type may be, for example, equal to (=), less than (<), greater than (>), less than or equal to (≦), or greater than or equal to (≧). Thus, wake-and-go mechanism 1008 may store the address, data value, and comparison value in wake-and-go array 1022.

Thread 1002 may alternatively include specialized processor instructions, operating system calls, or application programming interface (API) calls that instruct wake-and-go mechanism 1008 to populate wake-and-go array 1022 with a given address, data value, and comparison type.

Wake-and-go mechanism 1008 also may save the state of thread 1002 in thread state storage 1034, which may be allocated from memory 1032 or may be a hardware private array within the processor (not shown) or pervasive logic (not shown). When a thread is put to sleep, i.e., removed from the run queue of a processor, the operating system must store sufficient information on its operating state such that when the thread is again scheduled to run on the processor, the thread can resume operation from an identical position. This state information is sometime referred to as the thread's "context." The state information may include, for example, address space, stack space, virtual address space, program counter, instruction register, program status word, and the like.

If a transaction appears on bus 1020 that modifies a value at an address where the value satisfies the comparison type in wake-and-go array 1022, then wake-and-go mechanism 1008 may wake thread 1002. Wake-and-go array 1022 may have associated logic that recognizes the target address on bus 1020 and performs the comparison based on the value being written, the expected value stored in wake-and-go array 1022, and the comparison type stored in wake-and-go array 1022. Wake-and-go mechanism 1008 may wake thread 1002 by recovering the state of thread 1002 from thread state storage 1034. Thus, thread 1002 only wakes if there is a transaction that modifies the target address with a value that satisfies the comparison type and expected value.

Thus, in an exemplary embodiment, wake-and-go array 1022 may comprise a CAM and associated logic that will be triggered if a transaction appears on bus 1020 that modifies an address stored in the CAM. A transaction that modifies a value at a target address may be referred to as a "kill"; thus, wake-and-go array 1022 may be said to be "snooping kills." In this exemplary embodiment, the data values stored in the CAM are the target addresses at which threads are waiting for something to be written, an expected value, and a comparison type. The address at which a data value, a given target address, is stored is referred to herein as the storage address.

Each storage address may refer to a thread that is asleep and waiting for an event. Wake-and-go array 1022 may store multiple instances of the same target address, each instance being associated with a different thread waiting for an event at that target address. The expected values and comparison types may be different. Thus, when wake-and-go array 1022 snoops a kill at a given target address, wake-and-go array 1022 may return one or more storage addresses that are associated with one or more sleeping threads. When wake-and-go array 1022 snoops a kill at the given target address, wake-and-go array 1022 may also return the expected value and comparison type to associated logic that performs the comparison. If the comparison matches, then the associated logic may return a storage address to wake-and-go mechanism 1008 to wake the corresponding thread.

Figure 19:
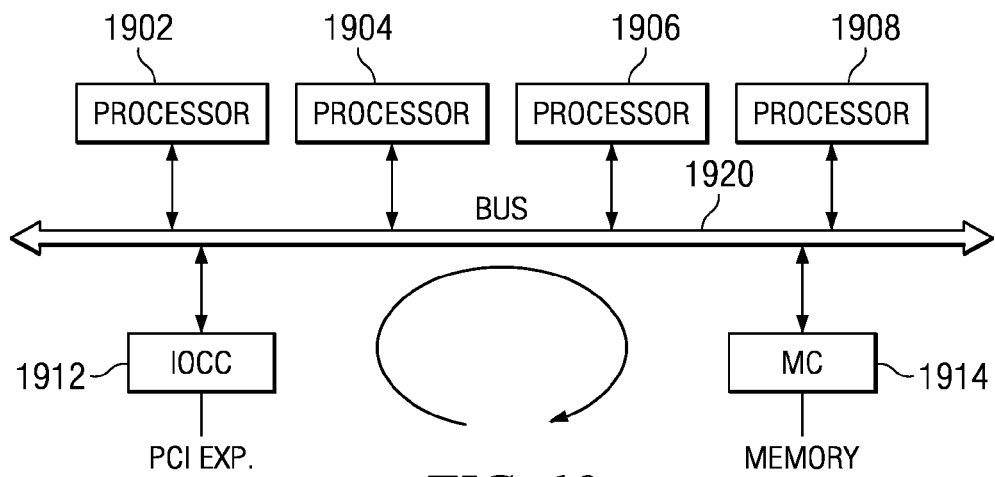
FIG. 19 is a block diagram illustrating data monitoring in a multiple processor system in accordance with an illustrative embodiment.

FIG. 19 is a block diagram illustrating data monitoring in a multiple processor system in accordance with an illustrative embodiment. Processors 1902-1908 connect to bus 1920. Each one of processors 1902-1908 may have a wake-and-go mechanism, such as wake-and-go mechanism 1008 in FIG. 10, and a wake-and-go array, such as wake-and-go array 1022 in FIG. 10. A device (not shown) may modify a data value at a target address through input/output channel controller (IIOC) 1912, which transmits the transaction on bus 1920 to memory controller 1914.

The wake-and-go array of each processor 1902-1908 snoops bus 1920. If a transaction appears on bus 1920 that modifies a value at an address where the value satisfies the comparison type in a wake-and-go array, then the wake-and-go mechanism may wake a thread. Each wake-and-go array may have associated logic that recognizes the target address on bus 1920 and performs the comparison based on the value being written, the expected value stored in the wake-and-go array, and the comparison type stored in the wake-and-go array. Thus, the wake-and-go mechanism may only wake a thread if there is a transaction on bus 1920 that modifies the target address with a value that satisfies the comparison type and expected value.

Figure 20:
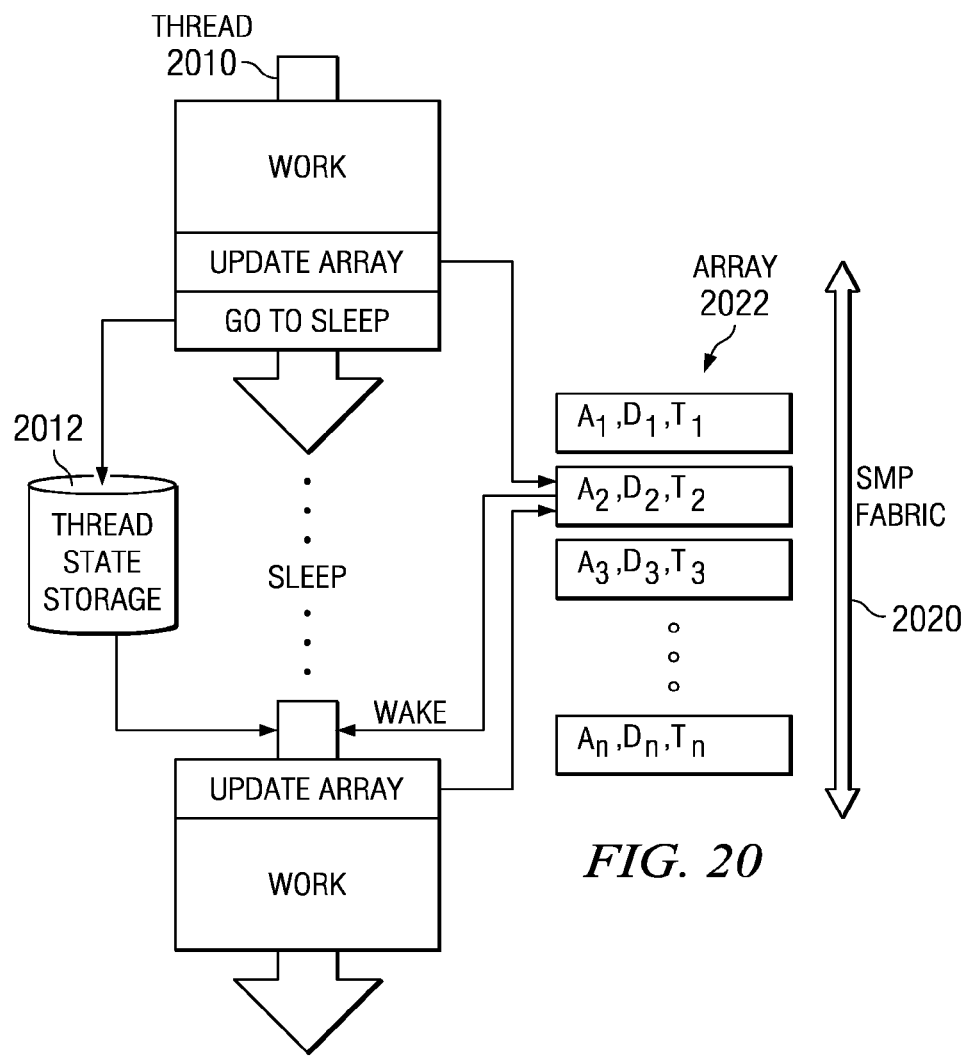
FIG. 20 is a block diagram illustrating operation of a wake-and-go mechanism in accordance with an illustrative embodiment.

FIG. 20 is a block diagram illustrating operation of a wake-and-go mechanism in accordance with an illustrative embodiment. Thread 2010 runs in a processor (not shown) and performs some work. Thread 2010 executes a series of instructions that are a programming idiom for wake-and-go, a specialized processor instruction, an operating system call, or an application programming interface (API) call. The wake-and-go mechanism may recognize the idiom, specialized processor instruction, operating system call, or API call, hereinafter referred to as a "wake-and-go operation." When the wake-and-go mechanism recognizes such a wake-and-go operation, the wake-and-go mechanism may store the target address $A_2$, expected data value $D_2$, and comparison type $T_2$ in wake-and-go array 2022, and stores thread state information for thread 2010 in thread state storage 2012. After updating wake-and-go array 2022 with the target address $A_2$, expected data value $D_2$, and comparison type $T_2$, the wake-and-go mechanism may put thread 2010 to sleep.

When a transaction appears on SMP fabric 2020 with an address that matches the target address $A_2$, logic associated with wake-and-go array 2022 may perform a comparison based on the value being written, the expected value $D_2$ and the comparison type $T_2$. If the comparison is a match, then the logic associated with wake-and-go array 2022 returns the storage address that is associated with thread 2010. The wake-and-go mechanism then wakes thread 2010 by retrieving the thread state information from thread state storage 2012 and placing the thread in the run queue for the processor.

Parallel Lock Spinning

Returning to FIG. 10, the instructions may comprise a get-and-compare sequence, for example. In an illustrative embodiment, the instructions may comprise a sequence of instructions that indicate that thread 1002 is spinning on a lock. A lock is a synchronization mechanism for enforcing limits on access to resources in an environment where there are multiple threads of execution. Generally, when a thread attempts to write to a resource, the thread may request a lock on the resource to obtain exclusive access. If another thread already has the lock, the thread may "spin" on the lock, which means repeatedly polling the lock location until the lock is free. The instructions for spinning on the lock represent an example of a programming idiom.

Wake-and-go mechanism 1008 within processor 1000 may recognize the spinning on lock idiom that indicates that thread 1002 is spinning on a lock. When wake-and-go mechanism 1008 recognizes such a programming idiom, wake-and-go mechanism 1008 may store the target address in wake-and-go array 1022 with a flag to indicate that thread 1002 is spinning on a lock. After updating wake-and-go array 1022 with the target address and setting the lock flag, wake-and-go mechanism 1008 may put thread 1002 to sleep. Thus, wake-and-go mechanism 1008 allows several threads to be spinning on a lock at the same time without using valuable processor resources.

If a transaction appears on bus 1020 that modifies a value at an address in wake-and-go array 1022, then wake-and-go mechanism 1008 may wake thread 1002. Wake-and-go mechanism 1008 may wake thread 1002 by recovering the state of thread 1002 from thread state storage 1034. Thread 1002 may then determine whether the transaction corresponds to the event for which the thread was waiting by performing a get-and-compare operation, for instance. If the lock bit is set in wake-and-go array 1022, then it is highly likely that the transaction is freeing the lock, in which case, wake-and-go mechanism may automatically wake thread 1002.

Figure 21A:
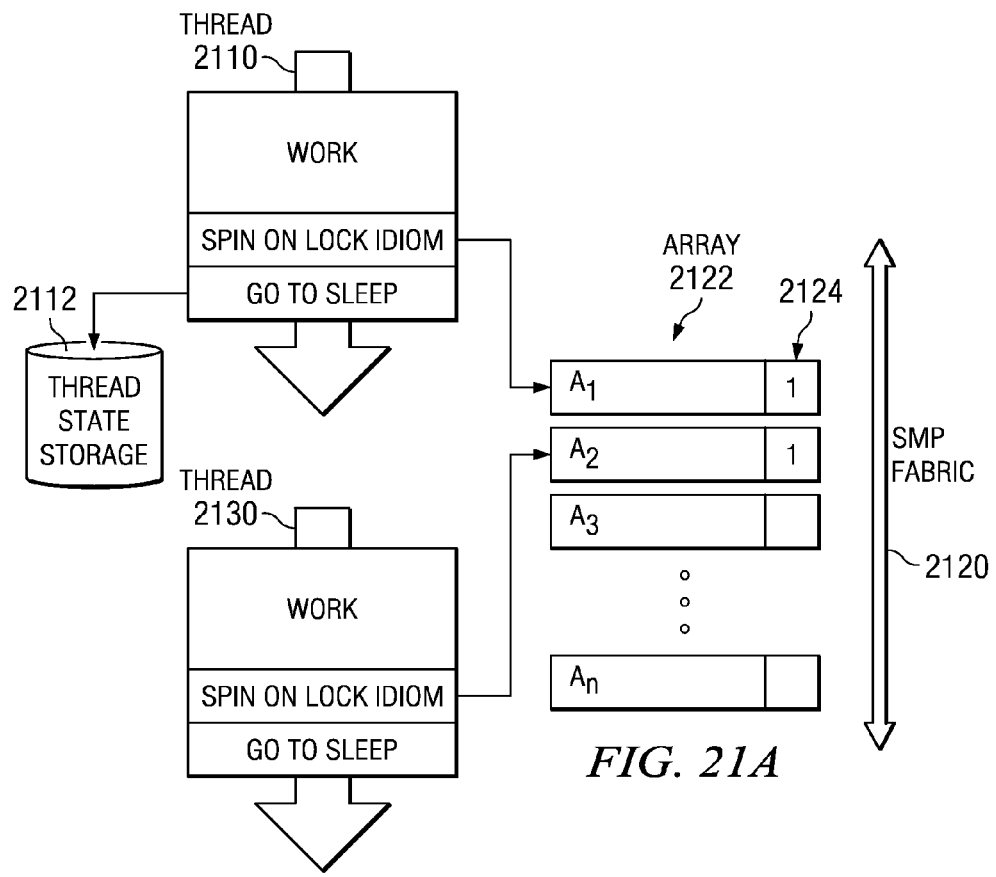
FIGS. 21A and 21B are block diagrams illustrating parallel lock spinning using a wake-and-go mechanism in accordance with an illustrative embodiment.
Figure 21B:
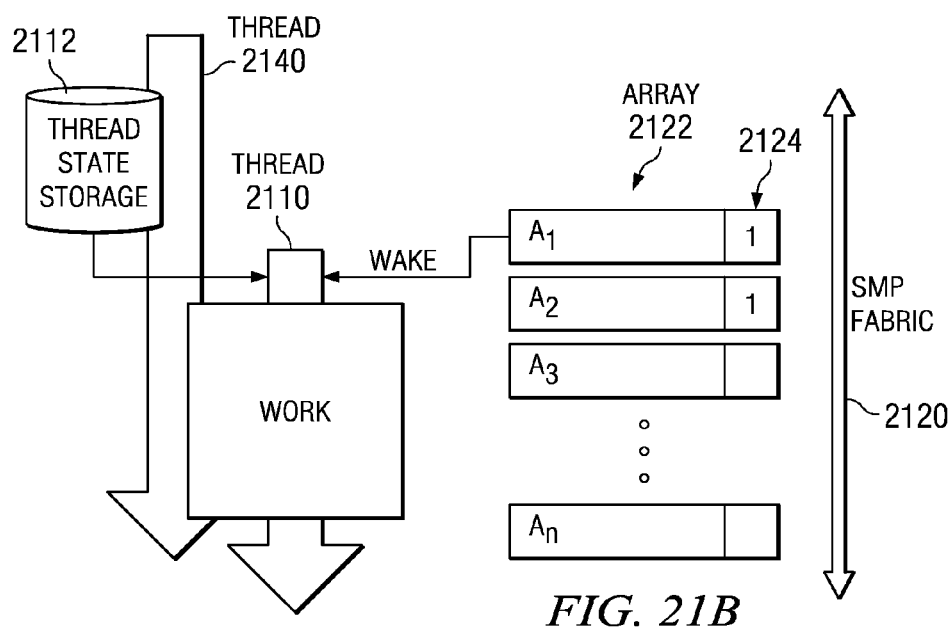

FIGS. 21A and 21B are block diagrams illustrating parallel lock spinning using a wake-and-go mechanism in accordance with an illustrative embodiment. With particular reference to FIG. 21A, thread 2110 runs in a processor (not shown) and performs some work. Thread 2110 executes a series of instructions that are a programming idiom for spin on lock. The wake-and-go mechanism may recognize the spin on lock operation idiom. When the wake-and-go mechanism recognizes such a programming idiom, the wake-and-go mechanism may store the target address $A_1$ in wake-and-go array 2122, set the lock bit 2124, and store thread state information for thread 2110 in thread state storage 2112. After updating wake-and-go array 2122 with the target address $A_1$, the wake-and-go mechanism may put the thread 2110 to sleep.

The processor may then run thread 2130, which performs some work. The wake-and-go mechanism may recognize a spin on lock operation idiom, responsive to which the wake-and-go mechanism stores the target address $A_2$ in wake-and-go array 2122, set the lock bit 2124, and store thread state information for thread 2130 in thread state storage 2112. After updating wake-and-go array 2122 with the target address $A_2$, the wake-and-go mechanism may put the thread 2130 to sleep.

Turning to FIG. 21B, thread 2140 runs in the processor and performs some work. When a transaction appears on SMP fabric 2120 with an address that matches the target address $A_1$, wake-and-go array 2122 returns the storage address that is associated with thread 2110. The wake-and-go mechanism then wakes thread 2110 by retrieving the thread state information from thread state storage 2112 and placing the thread in the run queue for the processor, because it is highly likely that the transaction is freeing the lock. Thread 2110 may update array 2122 to remove the target address. In the depicted example, thread 2110 and thread 2140 run concurrently in the processor. Thus, thread 2110 and thread 2130, and any number of other threads, may be spinning on a lock at the same time. When a lock is freed, the processor may wake the thread, such as thread 2110 in the depicted example, and the remaining threads may continue "spinning" on the lock without consuming any processor resources.

FIGS. 22A and 22B are flowcharts illustrating parallel lock spinning using a wake-and-go mechanism in accordance with the illustrative embodiments. Operation begins when a thread first initializes or when a thread wakes after sleeping. The operating system starts a thread (block 2202) by initializing the thread and placing the thread in the run queue for a processor. The thread then performs work (block 2204). The operating system determines whether the thread has completed (block 2206). If the thread completes, then operation ends.

If the end of the thread is not reached in block 2206, the processor determines whether the next instructions comprise a spin on lock idiom (block 2208). A spin on lock idiom may comprise a series of instructions, such as a load, compare, and branch sequence, for example. If the next instructions do not comprise a spin on lock idiom, the wake-and-go mechanism returns to block 2204 to perform more work.

If the next instructions do comprise a spin on lock idiom in block 2208, the wake-and-go mechanism updates the array with a target address associated with an event for which the thread is waiting (block 2210) and sets the lock bit in the wake-and-go array (block 2212). The update to the wake-and-go array may be made by the thread through a specialized processor instruction, the operating system, or a background sleeper thread. Next, the wake-and-go mechanism saves the state of the thread (block 2214) and puts the thread to sleep (block 2216). Thereafter, operation proceeds to FIG. 22B where the wake-and-go mechanism monitors for an event.

With reference now to FIG. 22B, the wake-and-go mechanism, which may include a wake-and-go array, such as a content addressable memory (CAM), and associated logic, snoops for a kill from the symmetric multiprocessing (SMP) fabric (block 2218). A kill occurs when a transaction appears on the SMP fabric that modifies the target address associated with the event for which a thread is waiting. The wake-and-go mechanism determines whether the value being written to the target address represents the event for which the thread is waiting (block 2220). If the lock bit is set, then it is highly likely that the event is merely freeing the lock. If the kill corresponds to the event for which the thread is waiting, then the wake-and-go mechanism updates the array (block 2222) to remove the target address from the wake-and-go array and reloads the thread state for the thread that was spinning on the lock (block 2224). Thereafter, operation returns to block 2202 in FIG. 22A where the operating system restarts the thread.

If the kill does not correspond to the event for which the thread is waiting in block 2220, then operation returns to block 2218 to snoop a kill from the SMP fabric. In FIG. 22B, the wake-and-go mechanism may be a combination of hardware within the processor, logic associated with the wake-and-go array, such as a CAM, and software within the operating system, software within a background sleeper thread, or other hardware.

Central Repository for Wake-and-Go Engine

As stated above with reference to FIG. 10, while the data processing system in FIG. 10 shows one processor, more processors may be present depending upon the implementation where each processor has a separate wake-and-go array or one wake-and-go array stores target addresses for threads for multiple processors. In one illustrative embodiment, one wake-and-go engine stores entries in a central repository wake-and-go array for all threads and multiple processors.

FIG. 23 is a block diagram illustrating a wake-and-go engine with a central repository wake-and-go array in a multiple processor system in accordance with an illustrative embodiment. Processors 2302-2308 connect to bus 2320. A device (not shown) may modify a data value at a target address through input/output channel controller (IIOC) 2312, which transmits the transaction on bus 2320 to memory controller 2314. Wake-and-go engine 2350 performs look-ahead to identify wake-and-go programming idioms in the instruction streams of threads running on processors 2302-2308. If wake-and-go engine 2350 recognizes a wake-and-go programming idiom, wake-and-go engine 2350 records an entry in central repository wake-and-go array 2352.

Wake-and-go engine 2350 snoops bus 2320. If a transaction appears on bus 2320 that modifies a value at an address where the value satisfies the comparison type in a wake-and-go array, then the wake-and-go engine 2350 may wake a thread. Wake-and-go engine 2350 may have associated logic that recognizes the target address on bus 2320 and performs the comparison based on the value being written, the expected value stored in the wake-and-go array, and the comparison type stored in central repository wake-and-go array 2352. Thus, wake-and-go engine 2350 may only wake a thread if there is a transaction on bus 2320 that modifies the target address with a value that satisfies the comparison type and expected value.

FIG. 24 illustrates a central repository wake-and-go-array in accordance with an illustrative embodiment. Each entry in central repository wake-and-go array 2400 may include thread identification (ID) 2402, central processing unit (CPU) ID 2404, the target address 2406, the expected data 2408, a comparison type 2410, a lock bit 2412, a priority 2414, and a thread state pointer 2416, which is the address at which the thread state information is stored.

The wake-and-go engine 2350 may use the thread ID 2402 to identify the thread and the CPU ID 2404 to identify the processor. Wake-and-go engine 2350 may then place the thread in the run queue for the processor identified by CPU ID 2404. Wake-and-go engine 2350 may also use thread state pointer 2416 to load thread state information, which is used to wake the thread to the proper state.

Programming Idiom Accelerator

In a sense, a wake-and-go mechanism, such as look-ahead wake-and-go engine 2350, is a programming idiom accelerator. A programming idiom is a sequence of programming instructions that occurs often and is recognizable as a sequence of instructions. In the examples described above, an instruction sequence that includes load (LD), compare (CMP), and branch (BC) commands represents a programming idiom that indicates that the thread is waiting for data to be written to a particular target address. Wake-and-go engine 2350 recognizes this idiom as a wake-and-go idiom and accelerates the wake-and-go process accordingly, as described above. Other examples of programming idioms may include spinning on a lock or traversing a linked list.

Figure 25:
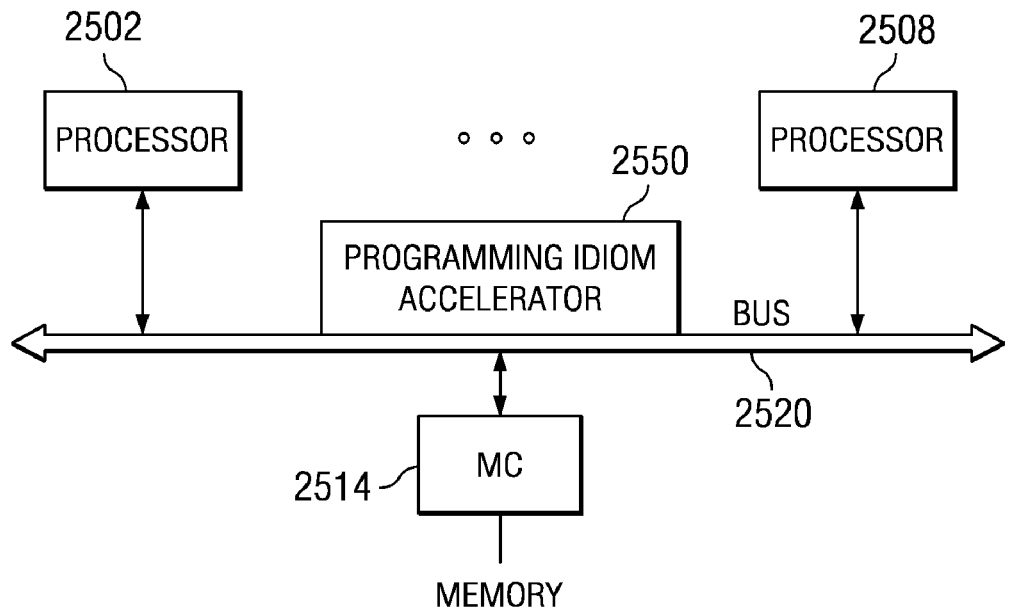
FIG. 25 is a block diagram illustrating a programming idiom accelerator in accordance with an illustrative embodiment.

FIG. 25 is a block diagram illustrating a programming idiom accelerator in accordance with an illustrative embodiment. Processors 2502-2508 connect to bus 2520. A processor, such as processor 2502 for example, may fetch instructions from memory via memory controller 2514. As processor 2502 fetches instructions, programming idiom accelerator 2550 may look ahead to determine whether a programming idiom is coming up in the instruction stream. If programming idiom accelerator 2550 recognizes a programming idiom, programming idiom accelerator 2550 performs an action to accelerate execution of the programming idiom. In the case of a wake-and-go programming idiom, programming idiom accelerator 2550 may record an entry in a wake-and-go array, for example.

As another example, if programming idiom accelerator 2550 accelerates lock spinning programming idioms, programming idiom accelerator 2550 may obtain the lock for the processor, if the lock is available, thus making the lock spinning programming sequence of instructions unnecessary. Programming idiom accelerator 2550 may accelerate any known or common sequence of instructions or future sequences of instructions. Although not shown in FIG. 25, a data processing system may include multiple programming idiom accelerators that accelerate various programming idioms. Alternatively, programming idiom accelerator 2550 may recognize and accelerator multiple known programming idioms. In one exemplary embodiment, each processor 2502-2508 may have programming idiom accelerators within the processor itself.

As stated above with respect to the wake-and-go engine, programming idiom accelerator 2550 may be a hardware device within the data processing system. In an alternative embodiment, programming idiom accelerator 2550 may be a hardware component within each processor 2502-2508. In another embodiment, programming idiom accelerator 2550 may be software within an operating system running on one or more of processors 2502-2508. Thus, in various implementations or embodiments, programming idiom accelerator 2550 may be software, such as a background sleeper thread or part of an operating system, hardware, or a combination of hardware and software.

Figure 26:
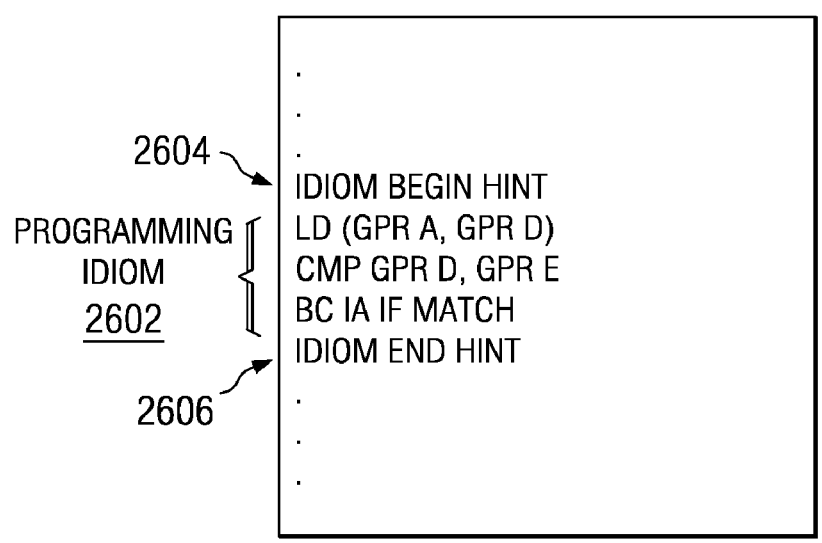
FIG. 26 is a series of instructions that are a programming idiom with programming language exposure in accordance with an illustrative embodiment.

In one embodiment, the programming language may include hint instructions that may notify programming accelerator 2550 that a programming idiom is coming. FIG. 26 is a series of instructions that are a programming idiom with programming language exposure in accordance with an illustrative embodiment. In the example depicted in FIG. 26, the instruction stream includes programming idiom 2602, which in this case is an instruction sequence that includes load (LD), compare (CMP), and branch (BC) commands that indicate that the thread is waiting for data to be written to a particular target address.

Idiom begin hint 2604 exposes the programming idiom to the programming idiom accelerator. Thus, the programming idiom accelerator need not perform pattern matching or other forms of analysis to recognize a sequence of instructions. Rather, the programmer may insert idiom hint instructions, such as idiom begin hint 2604, to expose the idiom 2602 to the programming idiom accelerator. Similarly, idiom end hint 2606 may mark the end of the programming idiom; however, idiom end hint 2606 may be unnecessary if the programming idiom accelerator is capable of identifying the sequence of instructions as a recognized programming idiom.

Figure 27:
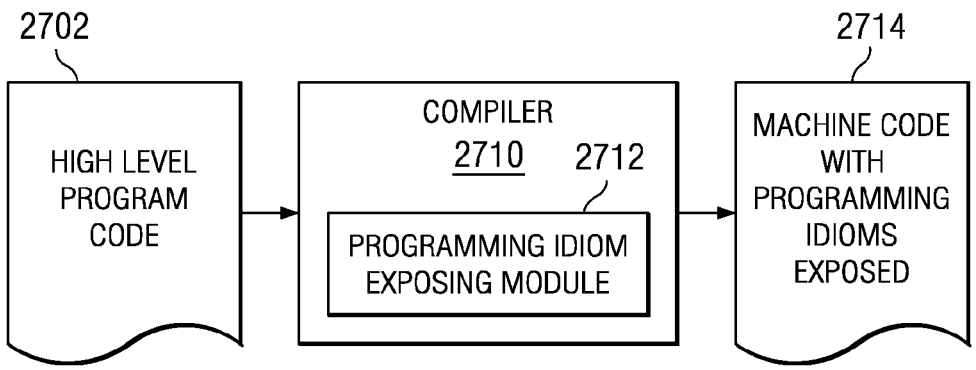
FIG. 27 is a block diagram illustrating a compiler that exposes programming idioms in accordance with an illustrative embodiment.

In an alternative embodiment, a compiler may recognize programming idioms and expose the programming idioms to the programming idiom accelerator. FIG. 27 is a block diagram illustrating a compiler that exposes programming idioms in accordance with an illustrative embodiment. Compiler 2710 receives high level program code 2702 and compiles the high level instructions into machine instructions to be executed by a processor. Compiler 2710 may be software running on a data processing system, such as data processing system 100 in FIG. 1, for example.

Compiler 2710 includes programming idiom exposing module 2712, which parses high level program code 2702 and identifies sequences of instructions that are recognized programming idioms. Compiler 2710 then compiles the high level program code 2702 into machine instructions and inserts hint instructions to expose the programming idioms. The resulting compiled code is machine code with programming idioms exposed 2714. As machine code 2714 is fetched for execution by a processor, one or more programming idiom accelerators may see a programming idiom coming up and perform an action to accelerate execution.

Figure 28:
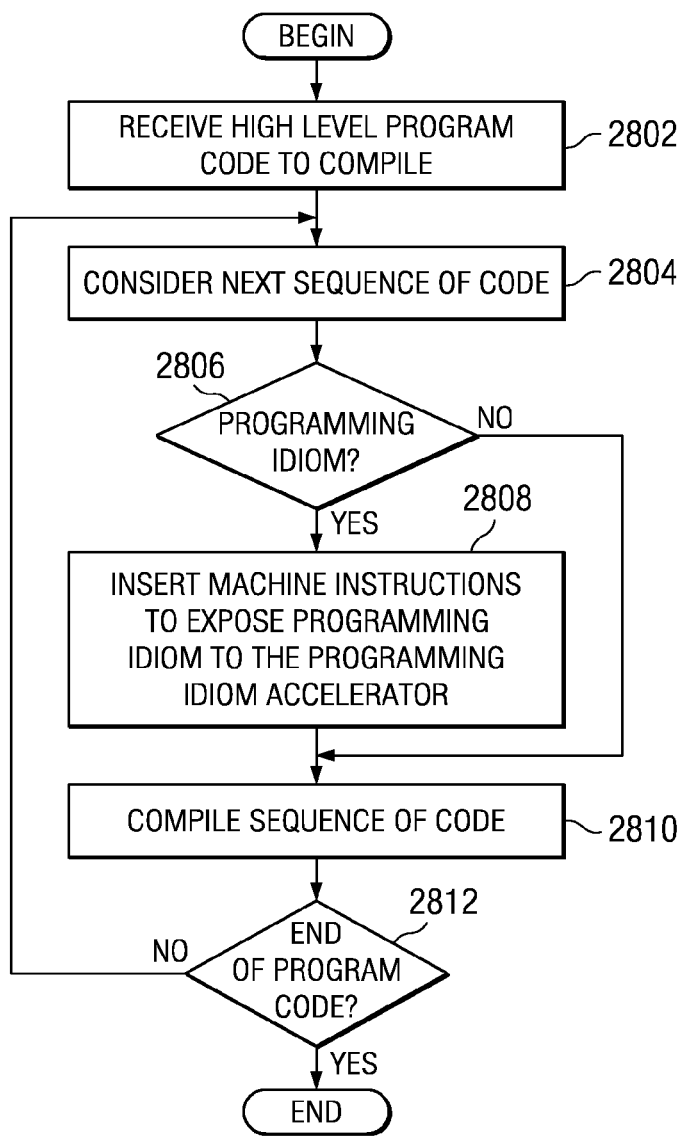
FIG. 28 is a flowchart illustrating operation of a compiler exposing programming idioms in accordance with an illustrative embodiment.

FIG. 28 is a flowchart illustrating operation of a compiler exposing programming idioms in accordance with an illustrative embodiment. Operation begins and the compiler receives high level program code to compile into machine code (block 2802). The compiler considers a sequence of code (block 2804) and determines whether the sequence of code includes a recognized programming idiom (block 2806).

If the sequence of code includes a recognized programming idiom, the compiler inserts one or more instructions to expose the programming idiom to the programming idiom accelerator (block 2808). The compiler compiles the sequence of code (block 2810). If the sequence of code does not include a recognized programming idiom in block 2806, the compiler proceeds to block 2810 to compile the sequence of code.

After compiling the sequence of code in block 2810, the compiler determines if the end of the high level program code is reached (block 2812). If the end of the program code is not reached, operation returns to block 2804 to consider the next sequence of high level program instructions. If the end of the program code is reached in block 2812, then operation ends.

The compiler may recognize one or more programming idioms from a set of predetermined programming idioms. The set of predetermined programming idioms may correspond to a set of programming idiom accelerators that are known to be supported in the target machine. For example, if the target data processing system has a wake-and-go engine and a linked list acceleration engine, then the compiler may provide hints for these two programming idioms. The hint instructions may be such that they are ignored by a processor or data processing system that does not support programming idiom accelerators.

Thus, the illustrative embodiments solve the disadvantages of the prior art by providing a wake-and-go mechanism for a microprocessor. When a thread is waiting for an event, rather than performing a series of get-and-compare sequences, the thread updates a wake-and-go array with a target address associated with the event. The target address may point to a memory location at which the thread is waiting for a value to be written. The thread may update the wake-and-go array using a processor instruction within the program, a call to the operating system, or a call to a background sleeper thread, for example. The thread then goes to sleep until the event occurs.

The wake-and-go array may be a content addressable memory (CAM). When a transaction appears on the symmetric multiprocessing (SMP) fabric that modifies the value at a target address in the CAM, which is referred to as a "kill," the CAM returns a list of storage addresses at which the target address is stored. The operating system or a background sleeper thread associates these storage addresses with the threads waiting for an even at the target addresses, and may wake the one or more threads waiting for the event.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read-only memory (CD-ROM), compact disk—read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a wake-and-go operation, the method comprising:
   examining, by a hardware wake-and-go mechanism within a processor, an instruction stream for a thread as the instruction stream is being pre-fetched;
   recognizing by the hardware wake-and-go mechanism, a programming idiom in the instruction stream that indicates the thread is waiting for an event that writes a data value to a target address;
   populating, by the hardware wake-and-go mechanism, a wake-and-go storage array with the target address;
   placing the thread in a sleep state;
   responsive to the event that writes the data value to the target address, determining whether to wake the thread; and
   in response to a determination that the thread is to be awoken, placing the thread in a non-sleep state.

2. The method of claim 1, wherein determining whether to wake the thread comprises determining whether a data value being written to the target address is a data value for which the thread is waiting.

3. The method of claim 1, wherein the event is an asynchronous event caused by a device outside a processor running the thread.

4. The method of claim 1, wherein the wake-and-go storage array is a content addressable memory and an address appearing on an address bus is used to address the content addressable memory.

5. The method of claim 4, wherein responsive to the event that writes the data value to the target address, the content addressable memory returns a storage address at which the target address is stored within the content addressable memory, wherein the storage address is associated with the thread.

6. The method of claim 4, wherein the content addressable memory snoops kills on a bus.

7. The method of claim 1, wherein the programming idiom is a get-and-compare sequence.

8. The method of claim 1, wherein the wake-and-go storage array stores multiple instances of the target address, wherein each instance is associated with a different thread waiting for an event at the target address.

9. The method of claim 8, wherein responsive to the event that writes the data value to the target address, the wake-and-go storage array returns multiple storage addresses, wherein each of the multiple storage addresses is associated with a sleeping thread.

10. A data processing system, comprising:
a hardware wake-and-go mechanism; and
a wake-and-go array,
wherein the hardware wake-and-go mechanism is configured to:
examine an instruction stream for a thread as the instruction stream is being pre-fetched;
recognize a programming idiom in the instruction stream that indicates the thread is waiting for an event that writes a data value to a target address;
populate the wake-and-go storage array with the target address;
place the thread in a sleep state;
responsive to the event that writes the data value to the target address, determine whether to wake the thread; and
in response to a determination that the thread is to be awoken, place the thread in a non-sleep state.

11. The data processing system of claim 10, wherein determining whether to wake the thread comprises determining whether a data value being written to the target address is a data value for which the thread is waiting.

12. The data processing system of claim 10, wherein the wake-and-go array is a content addressable memory and an address appearing on an address bus is used to address the content addressable memory.

13. The data processing system of claim 12, wherein responsive to the event that writes the data value to the target address, the content addressable memory returns a storage address at which the target address is stored within the content addressable memory, wherein the storage address is associated with the thread.

14. The data processing system of claim 12, wherein the content addressable memory snoops kills on a bus.

15. The data processing system of claim 10, wherein the wake-and-go storage array stores multiple instances of the target address, wherein each instance is associated with a different thread waiting for an event at the target address.

16. A hardware wake-and-go mechanism, comprising:
a wake-and-go storage array; and
wake-and-go logic, wherein the wake-and-go logic is configured to:
examine an instruction stream for a thread as the instruction stream is being pre-fetched;
recognize a programming idiom in the instruction stream that indicates the thread is waiting for an event that writes a data value to a target address;
populate the wake-and-go storage array with the target address;
place the thread in a sleep state;
responsive to the event that writes the data value to the target address, determine whether to wake the thread; and
in response to a determination that the thread is to be awoken, place the thread in a non-sleep state.

17. The hardware wake-and-go mechanism of claim 16, wherein the wake-and-go storage array is a content addressable memory and an address appearing on an address bus is used to address the content addressable memory, wherein the content addressable memory snoops kills on a bus.

18. The hardware wake-and-go mechanism of claim 17, wherein responsive to the event that writes the data value to the target address, the content addressable memory returns a storage address at which the target address is stored within the content addressable memory, wherein the storage address is associated with the thread.

19. The hardware wake-and-go mechanism of claim 16, wherein the wake-and-go storage array stores multiple instances of the target address, wherein each instance is associated with a different thread waiting for an event at the target address.

20. The hardware wake-and-go mechanism of claim 18, wherein responsive to the event that writes the data value to the target address, the wake-and-go storage array returns multiple storage addresses, wherein each of the multiple storage addresses is associated with a sleeping thread.

* * * * *